(12) United States Patent
Smith et al.

(10) Patent No.: US 11,802,956 B2
(45) Date of Patent: *Oct. 31, 2023

(54) ACTIVE GEO-LOCATION FOR ORTHOGONAL FREQUENCY DIVISION MULTIPLEX WIRELESS LOCAL AREA NETWORK DEVICES

(71) Applicant: SR Technologies, Inc., Sunrise, FL (US)

(72) Inventors: Graham K. Smith, Boca Raton, FL (US); Ryan Busser, Fort Lauderdale, FL (US); Olivia Turner, Pompano Beach, FL (US)

(73) Assignee: SR Technologies, Inc., Sunrise, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,047

(22) Filed: Apr. 14, 2023

(65) Prior Publication Data
US 2023/0251371 A1    Aug. 10, 2023

Related U.S. Application Data

(63) Continuation of application No. 17/532,088, filed on Nov. 22, 2021.

(60) Provisional application No. 63/129,134, filed on Dec. 22, 2020.

(51) Int. Cl.
*H04W 24/00* (2009.01)
*G01S 13/87* (2006.01)
*H04W 4/02* (2018.01)
*H04W 4/029* (2018.01)

(52) U.S. Cl.
CPC .......... *G01S 13/876* (2013.01); *H04W 4/023* (2013.01); *H04W 4/029* (2018.02)

(58) Field of Classification Search
CPC ...... G01S 13/876; H04W 4/029; H04W 4/023
See application file for complete search history.

(56) References Cited

U.S. PATENT DOCUMENTS

| 11,258,515 | B1 | 2/2022 | Wang |
| 2017/0359098 | A1 | 12/2017 | Tamma et al. |
| 2019/0053013 | A1 | 2/2019 | Markhovsky et al. |

(Continued)

*Primary Examiner* — Erika A Washington
(74) *Attorney, Agent, or Firm* — Christopher & Weisberg, P.A.

(57) ABSTRACT

A method in a first wireless device (WD) is described. The method includes determining a plurality of expected response signals, each having a scrambling seed number and an expected sequence of time domain symbols; receiving a plurality of response signals; determining a plurality of frequency shifted time domain samples, cross-correlating each frequency shifted time domain sample with the expected sequence of time domain symbols, for each scrambling seed number of each expected response signal; determining a maximum correlation value for each frequency shift and each frequency shifted time domain sample; summing the maximum correlation value for each frequency shift, each frequency shifted time domain sample, and each response signal; determining a peak correlation value based on the summed maximum correlation value; and determining at least the round trip time associated with the plurality of ranging signals based at least in part on the peak correlation value.

20 Claims, 18 Drawing Sheets

(56) References Cited

U.S. PATENT DOCUMENTS

2022/0078743 A1    3/2022  Fernandez et al.
2022/0110087 A1    4/2022  Smith et al.
2022/0196825 A1*  6/2022  Smith .................. H04W 4/029

* cited by examiner

ACTIVE GEO-LOCATION FOR ORTHOGONAL FREQUENCY DIVISION MULTIPLEX WIRELESS LOCAL AREA NETWORK DEVICES

CROSS-REFERENCE TO RELATED APPLICATION

This application is a continuation of U.S. patent application Ser. No. 17/532,088, filed Nov. 22, 2021, entitled "ACTIVE GEO-LOCATION FOR ORTHOGONAL FREQUENCY DIVISION MULTIPLEX WIRELESS LOCAL AREA NETWORK DEVICES," and which is related to and claims priority to U.S. Provisional Patent Application Ser. No. 63/129,134, filed Dec. 22, 2020, entitled IMPROVEMENTS FOR ACTIVE GEO-LOCATION FOR ORTHOGONAL FREQUENCY DIVISION MULTIPLEX WIRELESS LOCAL AREA NETWORK DEVICES, the entireties both of which are incorporated herein by reference.

TECHNICAL FIELD

The present disclosure relates to geo-location of wireless devices, and in particular to a method, device and system for the geo-location of wireless local area network (WLAN) devices.

BACKGROUND

Initially, it is noted that IEEE Standard 802.11-2016 is used as the base reference for disclosures used herein, the entire contents of which are incorporated herein by reference. The IEEE 802.11-2016 Standard is commonly referred to as "Wi-Fi" and is referred to as such herein.

The location of wireless devices can be determined by various methods. These methods may be classified as active, passive and combined active and passive. In an active location scheme, a device that is determining the location or range, the measuring device, transmits certain packets to the device being located, i.e., the target device, and a common method is to measure the time of arrival (TOA) of the response packet from the target device and compare that to the time of departure (TOD) of the request packet that was transmitted by the measuring device so as to determine the round trip time (RTT).

In such location systems, it is common to use multiple measuring devices to determine the location. In such a scheme, simultaneous TOA and/or TOD measurements are taken by different measuring devices situated at different points, and the location of the target device is calculated from these simultaneous measurements.

In an active location scheme, the TOD may be measured for a packet that is transmitted from the measuring station addressed to the target station. The TOA of the response from the target station at the measuring station is then also measured. If the turnaround time for the target station to receive the packet from the measuring station and to start to transmit the response is known, or is known to be a constant, then the time difference at the measuring station between the TOA and the TOD, minus the turnaround time at the target station will be directly proportional to twice the distance of the target station from the measuring station. For example, if the target station is a wireless device based upon IEEE 802.11 technology, and if the packet transmitted from the measuring station to the target station is a data packet, the response from the target station will normally be an acknowledgement (ACK) packet. If the packet transmitted from the measuring station to the target station is a control packet, for example a request-to-send (RTS) packet, then the response from the target station will normally be a clear-to-send (CTS) packet. In these two examples, the turnaround time at the target station is defined in the IEEE 802.11 standard as the short interframe spacing (SIFS), which is a preset value. Hence, the time delay, td, between the measuring station and the target station, may be determined from the calculation td=(TOA−TOD−SIFS)/2 and the distance between the measuring station and the target station is then td*c, where c is the speed of light. This method of estimating the distance to a target station by measuring the TOD and TOA and accounting for the turnaround time is known.

FIG. 1 is a diagram of a typical location system 100 which includes three measuring stations 110a, 110b, and 110c (referred to collectively herein as "measuring stations" or "measuring receivers" 110). The target station 120 may be a wireless device, such as, for example, an Access Point (AP) that is to be located by the three measuring stations 110. The distance of the target station 120 from measuring station 110a is D1, 130. The distance of the target station 120 from measuring station 110b is D2, 140. The distance of the target station 120 from measuring station 110c is D3, 150. The round trip time, RTT1, determined from the calculation RTT=(TOA−TOD−SIFS), is measured for transmissions from measuring station 110a and this can be used to calculate the distance D1 130 using the formula D1=RTT1*c/2 where c is the speed of light. Similarly, RTT2 and RTT3 measurements result in the determination of distances D2 140 and D3 150. The methods for calculating the location of target station 120 using the distances D1 130, D2 140, and D3 150 are well known.

FIG. 2 is a diagram of an airborne measuring station 110 actively geo-locating target stations 120a, 120b, 120c, and 120d. The target station 120a depicts the example of an outdoor device, target station 120b depicts the example of a device inside a residential home, target station 120c depicts the example of a device inside an automobile, and target station 120d depicts the example of a device inside an apartment. The obstruction losses for each of the target stations 120a, 120b, 120c, and 120d will differ and hence the maximum range at which the airborne measuring station 110 can successfully geo-locate the target stations will differ because the radio frequency (RF) obstruction losses will vary between the target stations. From the airborne measuring station's 110 perspective, the range will be dependent upon two factors: the transmit power of the ranging packet, which should be such that the target station will successfully receive it, and the receive sensitivity of the airborne measuring station 110 which would be such that the response packet is received successfully. Transmitting the ranging packet at a sufficiently high power is straightforward, e.g., by using a higher power amplifier and/or higher gain antenna, but the receive sensitivity of the airborne measuring station 110 is generally restricted to the noise figure of the receiver.

The signal level, Pr, received at the airborne measuring station 110 is:

$$Pr = Pt + G_1 + G_2 - L_{fs} - Lo \qquad (1)$$

Where Pt=Transmit power from the target station 120
$G_1$=Antenna gain at the airborne measuring station
$G_2$=Antenna gain at the target station
$L_{fs}$=Propagation loss, free space
Lo=Obstruction loss The obstruction loss, Lo, for the path from the target station 120a and the airborne measuring station 110 can be assumed to be zero as the target station 120a has a line-of-sight path to the airborne measuring station 110. In contrast, the obstruction losses for the other target stations may, for example, be in the order of 10 dB for target station 120b, 6 dB for target station 120c and 15-20 dB for target station 120d. The range of the airborne measuring station 110 to successfully detect the response packets from each of these target stations is limited due to the fixed sensitivity of the airborne measuring station 110 which is, in the general sense, restricted by the noise figure of the receiver and the need to receive a packet without errors.

SUMMARY OF THE INVENTION

Some embodiments advantageously provide a method, a device, and/or system for determining an RTT such as an RTT associated with a plurality of ranging signals transmitted by a first WD to a second WD. According to one aspect, a method (e.g., implemented in a first wireless device (WD), airborne station, etc.) is described. The method includes determining a plurality of expected response signals. Each expected response signal has a scrambling seed number and an expected sequence of time domain symbols corresponding to the scrambling seed number. The method further includes receiving a plurality of response signals from the second WD in response to the plurality of ranging signals. For each response signal of the plurality of response signals, a plurality of frequency shifted time domain samples is determined from each response signal, where each frequency shifted time domain sample corresponds to a frequency shift of a plurality of frequency shifts. Each frequency shifted time domain sample of the plurality of frequency shifted time domain samples is cross-correlated with the expected sequence of time domain symbols of each expected response signal of the plurality of expected response signals. The cross-correlating is performed for each scrambling seed number of each expected response signal.

A maximum correlation value is determined for each frequency shift and each frequency shifted time domain sample. The maximum correlation value is summed for each frequency shift, each frequency shifted time domain sample, and each response signal. The method further includes determining a peak correlation value based on the summed maximum correlation value and determining at least the RTT associated with the plurality of ranging signals based at least in part on the peak correlation value.

In some embodiments, the plurality of ranging signals are transmitted, each ranging signal being transmitted at a first time value. The peak correlation value is associated with a second time value. Determining the at least RTT associated with the plurality of ranging signals is further based at least in part on the first and second time values.

In some other embodiments, the cross-correlating uses a branched correlator including a plurality of cross-correlators and a plurality of parallel branches.

In an embodiment, each cross correlator corresponds to one parallel branch, and each cross-correlator is tuned to a different frequency offset to cover a range of carrier frequency offsets (CFO).

In another embodiment, each frequency shifted time domain sample of the plurality of frequency shifted time domain samples from each response signal is saved in one matched filter corresponding to one cross-correlator of the plurality of cross-correlators.

In some embodiments, a reception window is opened after each ranging signal is transmitted by the first WD to the second WD. At least one response signal is received after the reception window is opened. Determining the plurality of frequency shifted time domain samples is performed after the reception window is opened. The reception window is closed, and the cross-correlating is performed after the reception window is closed.

In some other embodiments, a maximum correlation output is determined for each frequency shifted time domain sample associated with the summed maximum correlation value, and a rolling sum value is calculated for each frequency shifted time domain sample. Further, a peak rolling sum correlation value is determined based on the rolling sum value, the rolling sum value (RS) being defined as:

For $AC = \{ac_1, ac_2, ac_3, \ldots ac_K\}$ where additive correlation, AC, is a sum of all reception windows in a burst, and K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in a rolling sum window, and,
for k=1 to K, $ac_k = \sum_{n=1}^{N} ac_{nk}$
where N is the number of ranging signals in a burst.

In an embodiment, the plurality of ranging signals is a burst of N transmissions of a series of bursts, there being a time interval (Tp) between a transmission of each ranging signal of the plurality of ranging signals and another ranging signal of the plurality of ranging signals that is immediately subsequent. Further, there is a wait time (Tw) between each burst of N transmission, and each ranging signal of the plurality of ranging signals is an orthogonal frequency division multiplex (OFDM) ranging signal.

In another embodiment, each ranging signal of the plurality of ranging signals is one of a request-to-send, RTS, signal and a data null signal.

According to another aspect, a first wireless device (WD) configured to determine at least a round trip time (RTT) associated with a plurality of ranging signals transmitted by the first WD to a second WD is described. The first WD includes a receiver configured to receive a plurality of response signals from the second WD in response to the plurality of ranging signals; and processing circuitry in communication with the receiver, where the processing circuitry is configured to determine the plurality of expected response signals, each expected response signal having a scrambling seed number and the expected sequence of time domain symbols corresponding to the scrambling seed number. For each response signal of the plurality of response signals, the processing circuit is further configured to determine a plurality of frequency shifted time domain samples from each response signal, each frequency shifted time domain sample corresponding to a frequency shift of a plurality of frequency shifts. In addition, the processing circuitry is configured to cross-correlate each frequency shifted time domain sample of the plurality of frequency shifted time domain samples with the expected sequence of time domain symbols of each expected response signal of the plurality of expected response signals. The cross-correlating is performed for each scrambling seed number of each expected response signal.

The processing circuitry is further configured to determine a maximum correlation value for each frequency shift and each frequency shifted time domain sample; sum the maximum correlation value for each frequency shift, each frequency shifted time domain sample, and each response signal; determine a peak correlation value based on the summed maximum correlation value; and determine at least the RTT associated with the plurality of ranging signals based at least in part on the peak correlation value.

In some embodiments, the processing circuitry is further configured to transmit the plurality of ranging signals, where each ranging signal is transmitted at a first time value. The peak correlation value is associated with a second time value. In addition, determining the at least RTT associated with the plurality of ranging signals is further based at least in part on the first and second time values.

In some other embodiments, the cross-correlating uses a branched correlator including a plurality of cross-correlators and a plurality of parallel branches.

In an embodiment, each cross correlator corresponds to one parallel branch, and each cross-correlator is tuned to a different frequency offset to cover a range of carrier frequency offsets (CFO).

In another embodiment, each frequency shifted time domain sample of the plurality of frequency shifted time domain samples from each response signal is saved in one matched filter corresponding to one cross-correlator of the plurality of cross-correlators.

In some embodiments, the processing circuitry is configured to open a reception window after each ranging signal is transmitted by the first WD to the target station. At least one response signal is received after the reception window is opened. Determining the plurality of frequency shifted time domain samples is performed after the reception window is opened. The reception window is closed, and the cross-correlating is performed after the reception window is closed.

In some other embodiments, a maximum correlation output is determined, e.g., via the processing circuitry, for each frequency shifted time domain sample associated with the summed maximum correlation value, and a rolling sum value is calculated, e.g., via the processing circuitry, for each frequency shifted time domain sample. Further, a peak rolling sum correlation value is determined, e.g., via the processing circuitry, based on the rolling sum value, the rolling sum value (RS) being defined as:

For $AC=\{ac_1, ac_2, ac_3, \ldots ac_K\}$ where additive correlation, AC, is a sum of all reception windows in a burst, and K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in a rolling sum window, and,
for k=1 to K, $ac_k = \sum_{n=1}^{N} ac_{nk}$
where N is the number of ranging signals in a burst.

In an embodiment, the plurality of ranging signals is a burst of N transmissions of a series of bursts, there being a time interval (Tp) between a transmission of each ranging signal of the plurality of ranging signals and another ranging signal of the plurality of ranging signals that is immediately subsequent. Further, there is a wait time (Tw) between each burst of N transmission, and each ranging signal of the plurality of ranging signals is an orthogonal frequency division multiplex (OFDM) ranging signal.

In another embodiment, each ranging signal of the plurality of ranging signals is one of a request-to-send, RTS, signal and a data null signal.

In another aspect, an airborne station configured to determine at least a round trip time (RTT) associated with a plurality of ranging signals transmitted by the airborne station to a target station is described. The airborne station includes a receiver configured to receive a plurality of response signals from the target station in response to the plurality of ranging signals; and processing circuitry in communication with the receiver. The processing circuitry is configured to determine a plurality of expected response signals, where each expected response signal has a scrambling seed number and an expected sequence of time domain symbols corresponding to the scrambling seed number. For each response signal of the plurality of response signals, the processing circuitry is configured to determine a plurality of frequency shifted time domain samples from each response signal, each frequency shifted time domain sample corresponding to a frequency shift of a plurality of frequency shifts. Further, the processing circuitry is further configured to cross-correlate each frequency shifted time domain sample of the plurality of frequency shifted time domain samples with the expected sequence of time domain symbols of each expected response signal of the plurality of expected response signals. The cross-correlating is performed for each scrambling seed number of each expected response signal.

In addition, the processing circuitry is configured to determine a maximum correlation value for each frequency shift and each frequency shifted time domain sample; sum the maximum correlation value for each frequency shift, each frequency shifted time domain sample, and each response signal; determine a peak correlation value based on the summed maximum correlation value; and determine at least the RTT associated with the plurality of ranging signals based at least in part on the peak correlation value.

In some embodiments, the cross-correlating uses a branched correlator including a plurality of cross-correlators and a plurality of parallel branches. Each cross correlator corresponds to one parallel branch, and each cross-correlator is tuned to a different frequency offset to cover a range of carrier frequency offsets (CFO). Each frequency shifted time domain sample of the plurality of frequency shifted time domain samples from each response signal is saved in one matched filter corresponding to one cross-correlator of the plurality of cross-correlators.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

This application incorporates U.S. patent application Ser. No. 16/708,923, U.S. patent application Ser. No. 16/782,762 and U.S. Provisional Application No. 63/088,269, by reference in their entireties. As an initial matter, it is noted that improving the effective sensitivity of the measuring receiver as compared with known arrangements will increase the range at which target stations 120 may be detected and located as compared to known methods. In one embodiment of the present disclosure, a single airborne measuring station 110 is used. The present disclosure provides methods and devices that increase the range of active geo-location from the airborne measuring station 110 as compared to known methods. In some embodiments, the disclosed method applies to the reception of orthogonal frequency division multiplex (OFDM) acknowledgement (ACK) and clear-to-send (CTS) packets in response to data null and request-to-send (RTS) packets respectively, in the Wi-Fi bands.

Figure 1:
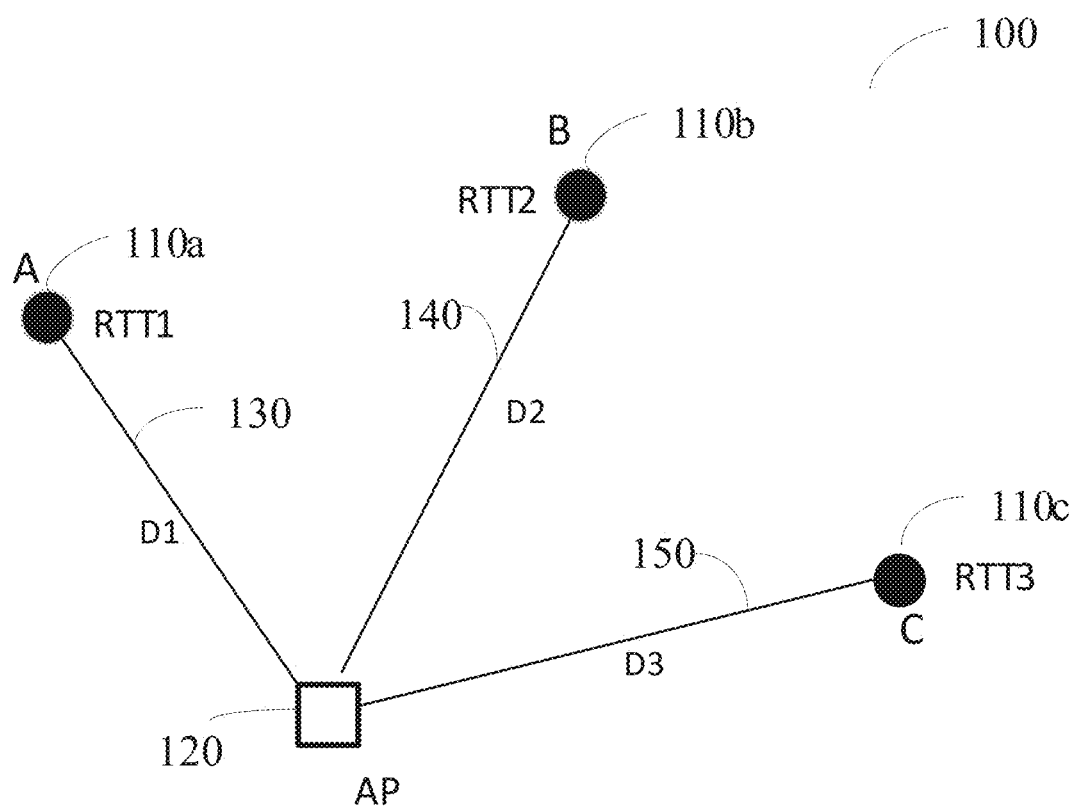
FIG. 1 is a diagram of a typical location system which includes three measuring stations.
Figure 2:
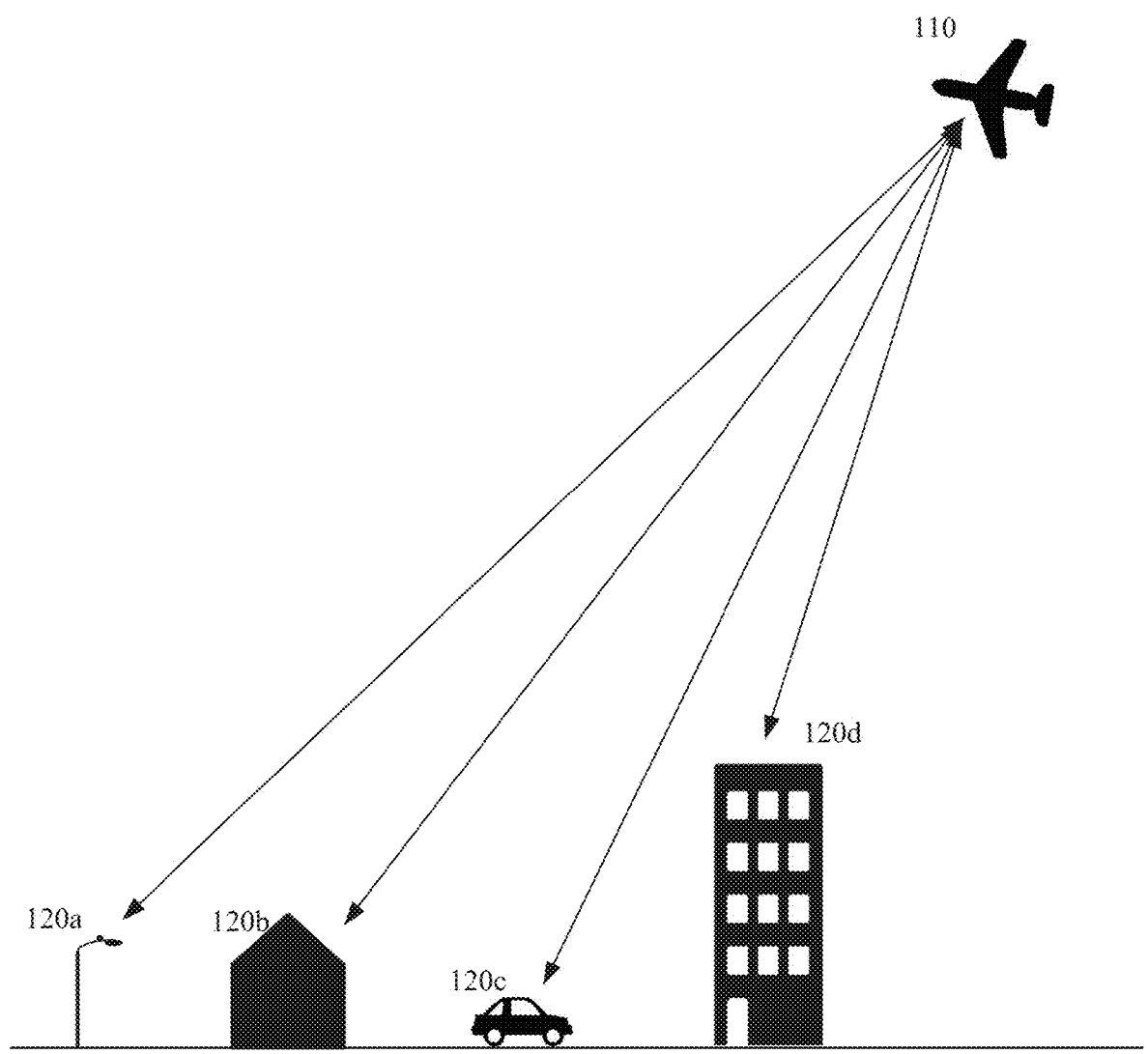
FIG. 2 is a diagram of an airborne measuring station actively geo-locating target stations.
Figure 3:
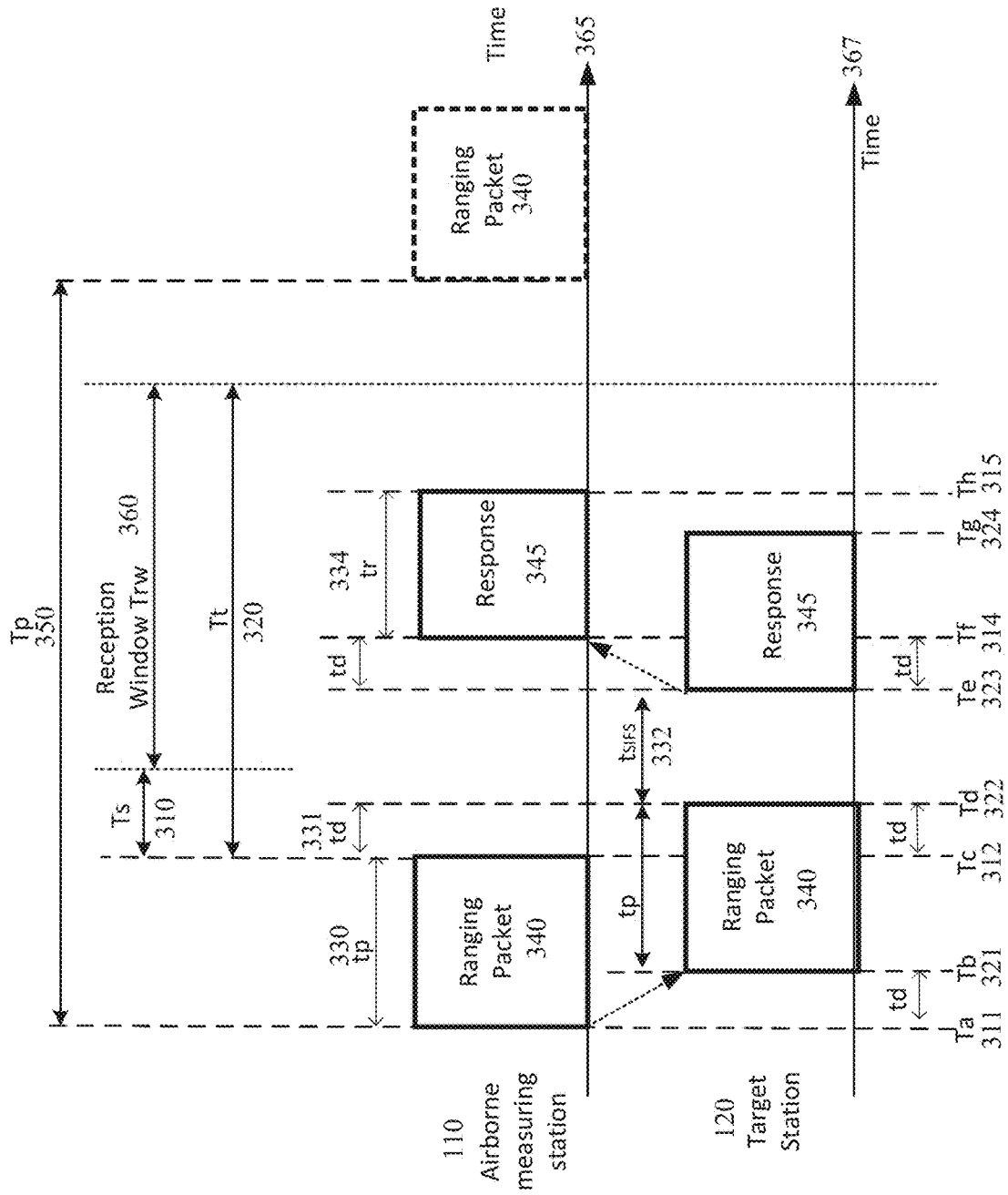
FIG. 3 is a timing diagram that describes the ranging method of the present disclosure that may be used to determine the distance between two wireless devices.

Reference is again made to the drawing figures in which like reference designators refer to like elements. FIG. 3 is a timing diagram that describes a ranging transmission method of the present disclosure that may be used to determine the distance between two wireless devices: an airborne measuring station 110 and a target station 120. Time axis 365 is the time axis for the airborne measuring station 110, and time axis 367 is the time axis for the target station 120. At time Ta 311, airborne measuring station 110 starts the transmission of ranging packet 340 which is addressed to target station 120. After a time-delay of td, at time Tb 321, target station 120 starts to receive ranging packet 340. At time Tc 312, airborne measuring station 110 completes the transmission of ranging packet 340, and at time Td 322, target station 120 completes the reception of ranging packet 340. The time difference between Tc 312 and Td 322 is td 331, the propagation time for the packet to travel from airborne measuring station 110 to target station 120. Note that the time differences (Tc−Ta) and (Td−Tb) are both the duration tp 330 of the transmitted ranging packet 340.

Target station 120 transmits the response packet 345 at time Te 323. Assuming that the response packet 345 is an ACK or an RTS packet in reply to the received ranging packet 340, time Te 323 ideally will be at a time $t_{SIFS}$ 332 after time Td 322, where $t_{SIFS}$ 332 is the SIFS time as defined in the IEEE 802.11 Standard. At time Tf 314, airborne measuring station 110 starts to receive the response packet 345. At time Tg 324, target station 120 completes the transmission of the response packet 345 and at time Th 315, airborne measuring station 110 completes receiving the response packet 345. Note that the time differences (Tb−Ta), (Td−Tc), (Tf−Te), and (Th−Tg) are all equal and have the value td 331 which is the propagation time for the packet and response to travel between the two stations.

At airborne measuring station 110, the time of a packet at the point when the frame check has completed, may be recorded. Hence, the time for the transmission of ranging packet 340 that is recorded, is Tc 312, and the time that is recorded for the reception of the response packet 345 is Th 315. In order to calculate the value of td 331, it is desirable to know the duration tr 334 of the response packet 345. Calculating the duration tr 334 is straightforward as the duration of the response packet 345 is defined in the Standard. In practice therefore, airborne measuring station 110 can calculate the value of td from expression (3):

$$td=(Th-Tc-tr-t_{SIFS})/2 \quad (2)$$

$$\text{and hence the corresponding distance,} D=td*c \quad (3)$$

Stated another way, airborne measuring station 110 begins transmission of ranging packet 340 at a beginning transmission time Ta 311 and ends transmission of the ranging packet 340 at an ending transmission time Tc 312. Airborne measuring station 110 begins receiving the first response packet 345 at a beginning reception time Tf 314 and receives the complete first response packet 345 at an ending reception time Th 315, wherein td 331 is measured as the time between the ending reception time Th 315 and the ending transmission time Tc 312, minus the duration tr 334 of the response packet, minus $t_{SIFS}$ 332, divided by 2.

A reception window Trw 360 may be defined which may be related to the range of the target station 120 from the airborne measuring station 110. The reception window starts at time Ts 310 after the end of the transmission Tc 312 of ranging packet 340 and ends at time Tt 320 after the end of the transmission Tc 312 of ranging packet 340. As an example, the reception window Trw 360 may be set to start at time Ts 310, 10 μs after time Tc 312, and end at time Tt 320, 60 μs after time Tc 312. In this example the duration of the reception window Trw 360 is 50 μs. Airborne measuring station 110 may transmit ranging packets 340 at time intervals of Tp 350.

Figure 4:
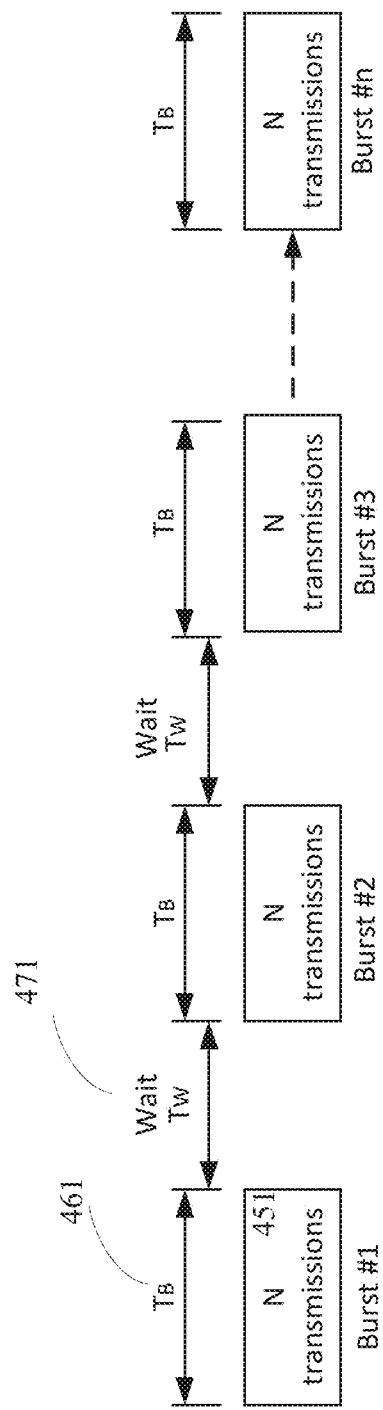
FIG. 4 is a timing diagram of a series of bursts of transmissions of the ranging packets.

FIG. 4 is a timing diagram of a series of bursts of transmissions of the ranging packets 340. In one embodiment of this disclosure, a "burst", 461, consisting of a preset number N 451 of transmissions of packets 340 from airborne measuring station 110, may be sent, followed by a "wait" period, Tw 471. This sequence may continue until a command may be issued to terminate the transmissions. Within each burst, each of the N transmissions may be separated by a preset time, Tp 350. The duration TB of each burst will therefore be N·Tp. For example, a burst may consist of 100 transmissions of packets 340 from airborne measuring station 110, each transmission, say, 1 ms apart, followed by a wait period of, say, 30 ms after which another burst of 100 transmissions may be sent. In this example the duration of each burst is 100 ms.

In the case that there is a single airborne measuring station 110, as may be the case when the station is airborne, then the three measuring distances D1 130, D2 140, and D3 150 will be taken at different points in time. In this case, the airborne measuring station 110 may be flying over an area and periodically transmitting the packets 340, receiving the response packets 345 and calculating the delay time td. Over time, the location of target station 120 can be calculated with increasing accuracy as more measurements are taken by the airborne measuring station 110 from varying positions. Such calculations are well known.

As mentioned previously, the packet exchange may be any pair of packets where an automatic response packet is sent. Commonly used packets in Wi-Fi include an RTS/CTS exchange and a Data (null)/ACK exchange.

In one embodiment of the present disclosure, a single airborne measuring station 110 is used. A method and devices are disclosed that increase the range of active geo-location from the airborne measuring station 110 as compared with prior methods and systems by increasing the effective receive sensitivity of the airborne measuring station 110. In some embodiments, the disclosed method applies to the reception of OFDM ACK and CTS packets in response to data null and RTS packets respectively.

The OFDM waveform preamble is defined in the IEEE Standard as a 320-sample sequence composed of a Short Training Field and Long Training Field, each 160 samples long. The Short Training Field (STF) is typically used by receivers for initial packet detection, automatic gain control (AGC) convergence, and coarse synchronization. The Long Training Field (LTF) is typically used by receivers to refine synchronization and to estimate the channel frequency response. The LTF waveform was designed to have good autocorrelation properties with reasonable peak-to-average power.

Examples of two correlation schemes that may be utilized to detect OFDM waveforms include cross correlation and autocorrelation. Cross correlation compares received samples to a local copy of the waveform searching for a match. Autocorrelation compares recently-received samples to previously-received samples searching for a known periodicity. Cross correlation has an advantage of only considering one vector of noisy samples, computing the correlation metric by multiplying this vector by a noiseless copy of the transmitted waveform. However cross correlation suffers in the presence of realistic wireless degradations including carrier frequency offset CFO and multipath fading. Autocorrelation is robust to CFO and multipath fading as each copy of a training symbol is subjected to identical degradations, thereby preserving the waveform's underlying periodicity. However, autocorrelation suffers from the extra noise admitted by computing a correlation metric using two vectors of (noisy) received samples.

Cross correlation provides the better performance with respect to receive sensitivity than autocorrelation but the performance will degrade significantly in the presence of CFO. The IEEE 802.11 Standard requires transmit center frequency accuracy of ±20 ppm. Decoding the OFDM payload is further complicated by scrambling. According to the IEEE 802.11 Standard, a pseudo-random 7-bit scrambling seed is used for each 802.11 OFDM packet. The OFDM receiver recovers this seed from the scrambled Service field in the first OFDM symbol following the Signal field. However, if a bit error occurs in the decoded Service field, the descrambled payload will be totally in error. The probability of a bit error in the Service field becomes higher as the SNR decreases. Hence, if attempting to detect an OFDM CTS or ACK packet at low or negative SNR levels, there is a high probability that one or more bits in the Service field may be in error, and the scrambler seed may not be recoverable.

As discussed above, a preamble detector using cross correlation provides the better SNR sensitivity or receive signal sensitivity, but the sensitivity degrades with CFO. A brute force solution to the CFO problem is described that includes a "branched correlator" using multiple parallel cross correlators, "branches", each tuned to a different CFO within the range of offsets permitted by the IEEE 802.11 Standard.

Assuming a carrier frequency of 5.815 GHz, channel 161 at the top end of the Wi-Fi 5 GHz band, a 20 ppm error is 116.3 kHz. The time for 320 samples is nominally 16 µs but with a 1 ppm error, this time would be ~15.995 µs, an error of 0.00465 µs, about 9% of a sample error for the last sample. Over a complete ACK packet of 880 samples, the 1 ppm error is 0.0128 µs, a 25% sample error for the last sample. Hence, in order to not excessively degrade the cross correlation of the 320 samples of the preamble, the CFO error may be restrained to be less than, say, 2.5 ppm, and for the full 880 samples of the ACK packet, the CFO error may be restrained to be about 1.25 ppm. In one embodiment of this disclosure the number of parallel cross correlators branches selected is sixteen, resulting in 16 parallel detectors, which may, for example, be tuned to [−18.75, −16.25, −13.75, −11.25, −8.75, −6.25, −3.75, −1.25, +1.25, +3.75, +6.25, +8.75, +11.25, +13.75, +16.25, +18.75] ppm.

Figure 5:
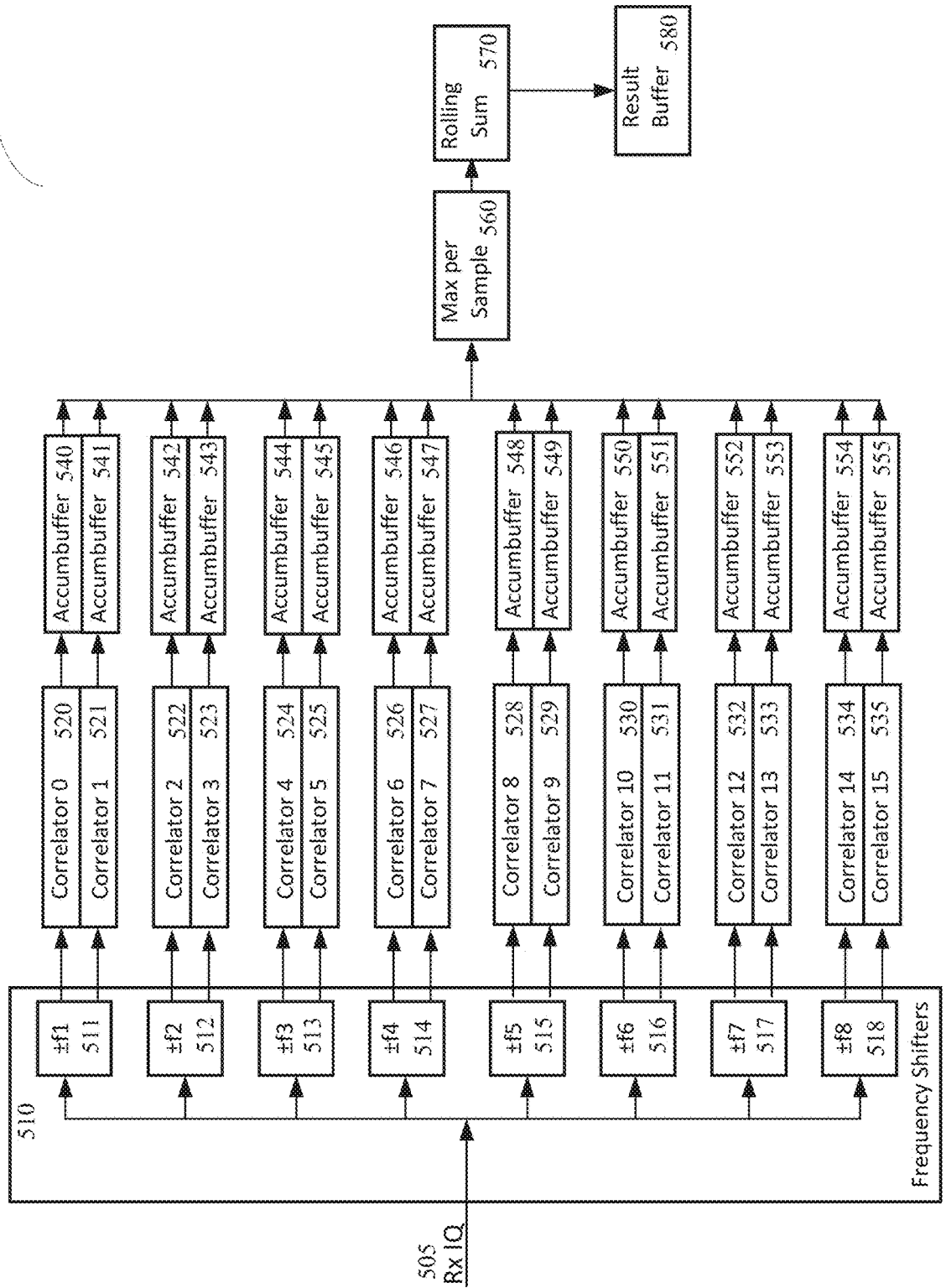
FIG. 5 is a functional block diagram of an exemplar OFDM branched correlator for one embodiment of this disclosure where the number of parallel cross correlator branches selected is sixteen.

FIG. 5 is a functional block diagram of an example OFDM branched correlator 500 for one embodiment of this disclosure where the number of parallel cross correlator branches selected is sixteen. The branched decoder is further shown in FIG. 9 and described below, where the additional complexity of cross correlating against each scrambling seed is discussed. The complex received baseband sampled stream 505 is inputted to a frequency shifter block 510. The frequency shifter block 510 comprises eight frequency shifters 511, 512, 513, 514, 515, 516, 517, and 518. Each frequency shifter 511 to 518 is configured with an independent frequency shift value and outputs two sample streams, one with a positive frequency shift and one with a negative frequency shift. The eight frequency shifted sample streams are each fed into independent correlation blocks 520, 521, 522, 523, 524, 525, 526, 527, 528, 529, 530, 531, 532, 533, 534, and 535 implementing a complex cross correlation that searches for the 802.11 OFDM response packet 345. Each correlator 520 to 535 re-computes a complete complex cross correlation in every sample period. In order to combine across reception windows, these complex values cannot be directly summed since the phase of each correlation peak is arbitrary and unknowable. Thus, the complex-valued output of the correlator in each branch is reduced to a real magnitude. The output of each correlator 520 to 535 is then inputted into a corresponding accumulation buffer, 540 to 555, respectively, where the correlation values for each sample are summed for each reception window n in the burst of N transmissions. This summing scheme is referred to as "additive correlation" and is described below with reference to FIGS. 10, 11, 12, 13, and 14. At the end of a burst of N transmissions, as described above with reference to FIG. 4, the maximum value for each corresponding sample in the sixteen accumulator buffers, 540 to 555, is selected at block 560. A "rolling sum" 570 is then applied to the maximum correlation values. As discussed below with reference to FIG. 15, Wi-Fi target stations, 120, in the general sense, exhibit a dither in their turnaround time, $t_{SIFS}$ 332, resulting in a jitter between the relative timing of the correlation peaks between reception windows. The rolling sum is used to overcome this jitter. The details of the rolling sum are discussed below with reference to FIGS. 16 and 17. The final result for the burst of N transmissions is stored in the result buffer 580.

The IEEE 802.11 Standard allows frequency offsets of ±20 ppm. In the branched correlator example depicted in FIG. 5 a sixteen branch architecture is shown so that evenly distributed branches would achieve acceptable performance across this ±20 ppm range at the higher 5 GHz center frequencies for the complete OFDM response packet 345. The sixteen branches may be tuned at 1.5 ppm spacing, e.g., so as to reduce errors due to CFO. In another embodiment the center frequencies of the branches may be programmable, and the center frequencies may be changed between bursts 451, e.g., such that even tighter ppm spacing may be used.

Figure 6:
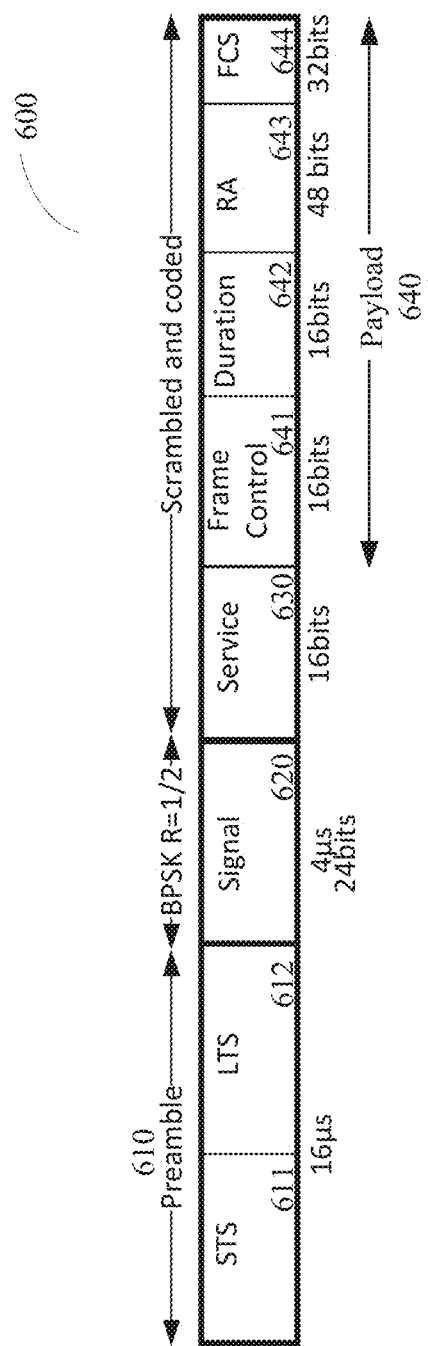
FIG. 6 is the format for CTS and ACK OFDM packets which may be the response packet.

FIG. 6 is a format for CTS and ACK packets 600 (e.g., ACK OFDM packets) which may be the response packet 345. As described in the IEEE 802.11 Standard, the 12 symbol, OFDM preamble 610, comprising the short timing sequence (STS) 611 and the long timing sequence (LTS) 612, is followed by the 1 symbol Signal field 620. The Signal field 620 is modulated BPSK (binary phase shift keying) with rate 1/2 convolutional coding. The Signal field 620 consists of the following sub-fields: Rate (4 bits), Reserved (1 bit), Length (12 bits) Parity (1 bit), and Tail (6 bits). The values of each bit in the Signal field 620 for a CTS or ACK packet, responding to a known RTS or data null packet, are known. There are a total of 48 coded data bits in the OFDM Signal field 620. These bits represent a unique 48-bit sequence for 6 Mbps OFDM ACK and CTS packets. The Signal field 620 is followed by the 16-bit Service field 630 with bits 0-6 set to zero followed by 9 reserved bits. The Service field 630 is followed by the payload 640 comprising the frame control field 641, the duration field 642 the receiver address RA 643 and the frame check sum FCS 644. Bits 0-6 of the Service field 630 are transmitted first and are used to synchronize the descrambler in the receiver, as described in the IEEE 802.11 Standard. The transmit 7-bit scrambler seed is random but because the first 7 pre-scrambled bits are zero, the receiver can effectively recover the seed. If, however, there is a bit error in those first 7 bits, then the receiver cannot effectively recover the seed and cannot decode correctly the rest of the packet following the Service field 630, including, in particular, the payload containing the frame control field 641 and the RA field 643. Expressed another way, the Signal field 620 is not scrambled, and therefore, the time domain symbols of the preamble and the Signal field are completely determinable, whereas the rest of the packet is scrambled with one of 127 possible versions.

In the time domain, the preamble 610 is 320 samples and the Signal field 620 is 80 samples. With reference to the IEEE 802.11-2016 Standard, Table 1-4 is the "Time domain representation of the short sequence", Table 1-6 is the "Time domain representation of the long sequence" and Table 1-12 is the "Time domain representation of the SIGNAL field". The time domain representation of the complete CTS and ACK OFDM packet can be determined for each of the 127 scrambler seeds.

As discussed below with reference to FIG. 9, in one embodiment of this disclosure, for each of the 127 scrambler seeds, the 880 time domain samples of the CTS or ACK packet 600 are correlated in each branch of the branched correlator 500.

A method and devices are disclosed that correlates, in the time domain, each received response packet 345 against all 127 possible scrambler seeds, during a burst 451.

The probability of a symbol error, Ps, for a binary phase modulation, is $$Ps = 0.5 \, erfc\sqrt{S/N} \quad (4)$$

Where "erfc" is the Gauss complimentary or function
S/N is signal to noise ratio The received signal level may be calculated using the standard formula:

$$Pr = 10 \log(1000 \, K \, T) + 10 \log BW + NF + SNR \, dBm \quad (5)$$

Where K is Boltzmann's constant
T is temperature in degrees Kelvin
BW is the occupied bandwidth, Hz
NF is the noise figure, dB For T=20° Celsius, 10 log (1000 K T)=−174 dBm
BW=20 MHz for OFDM and assuming NF=3 dB,
from (5) Pr=−98+SNR dBm.

As discussed above with reference to FIG. 6, if all the time domain symbols of the CTS or ACK 600 response packet 345 are known in advance, then the received symbols may be compared to the expected symbols. If enough of the symbols match, then a decision may be made that the response packet 345 had indeed been detected. This technique is known as correlation where the decision may be based upon a correlation threshold.

In the general sense, cross-correlation works by passing the locally known pattern of symbols across the received noisy pattern of symbols, and if the symbols agree, they add, if not they subtract.

For a packet of M symbols, M·Ps symbols will not match and M·(1−Ps) will match,

Hence Correlation=(Match−Mismatch)/Total or $$Correlation = (M - 2M \, Ps)/M = 100(1 - 2Ps) \quad (6)$$

For example, for Ps=0.2, Correlation=(1−2×0.2)=0.6 or 60%

Note that for pure noise, Ps=0.5 and hence M/2 symbols will agree (match), and M/2 symbols will not agree (mismatch), and correlation will be 0%.

If the known 880 symbols of the OFDM response packet 345 are correlated across the raw received symbols, then it is possible to detect an OFDM response packet 345 that is well below the noise level.

For a given SNR, the symbol error Ps may be calculated using equation (5) and the correlation % calculated using equation (6). The variance and standard deviation, σ, of the mismatched symbols may be calculated:

$$\sigma^2 = M \cdot Ps(1-Ps)$$

$$\sigma = \sqrt{M \cdot Ps(1-Ps)} \quad (7)$$

For M symbols, the number of mismatched symbols is M·Ps, with a standard deviation of σ. Hence, mismatched bits=M·Ps±σ, and the number of matched bits is M−(M·Ps±σ).
Thus, the correlation from equation (7) expressed as mean±standard deviation, is given by:

$$\text{Correlation} = (M - (M\,Ps \pm \sigma) - (m\,Ps \pm \sigma))/M \quad (8)$$
$$= 1 - 2\,Ps \pm 2\sigma/M$$

Comparing (9) to (7), the following associations can be made:

$$\text{Correlation mean} = (1-2Ps)$$

and Correlation standard deviation=2σ/M. (10)

Noise has a symbol error rate, Ps=0.5 with a mean of zero and, from equation (7), σ=√M/4 and from equation (10)

$$\text{noise correlation standard deviation} = \sqrt{1/M} \quad (11)$$

Hence, the effective "3σ correlation" for thermal noise is 3√1/M, i.e., for M=880 thermal noise 3σ correlation=0.101 or 10.1%.

Figure 7:
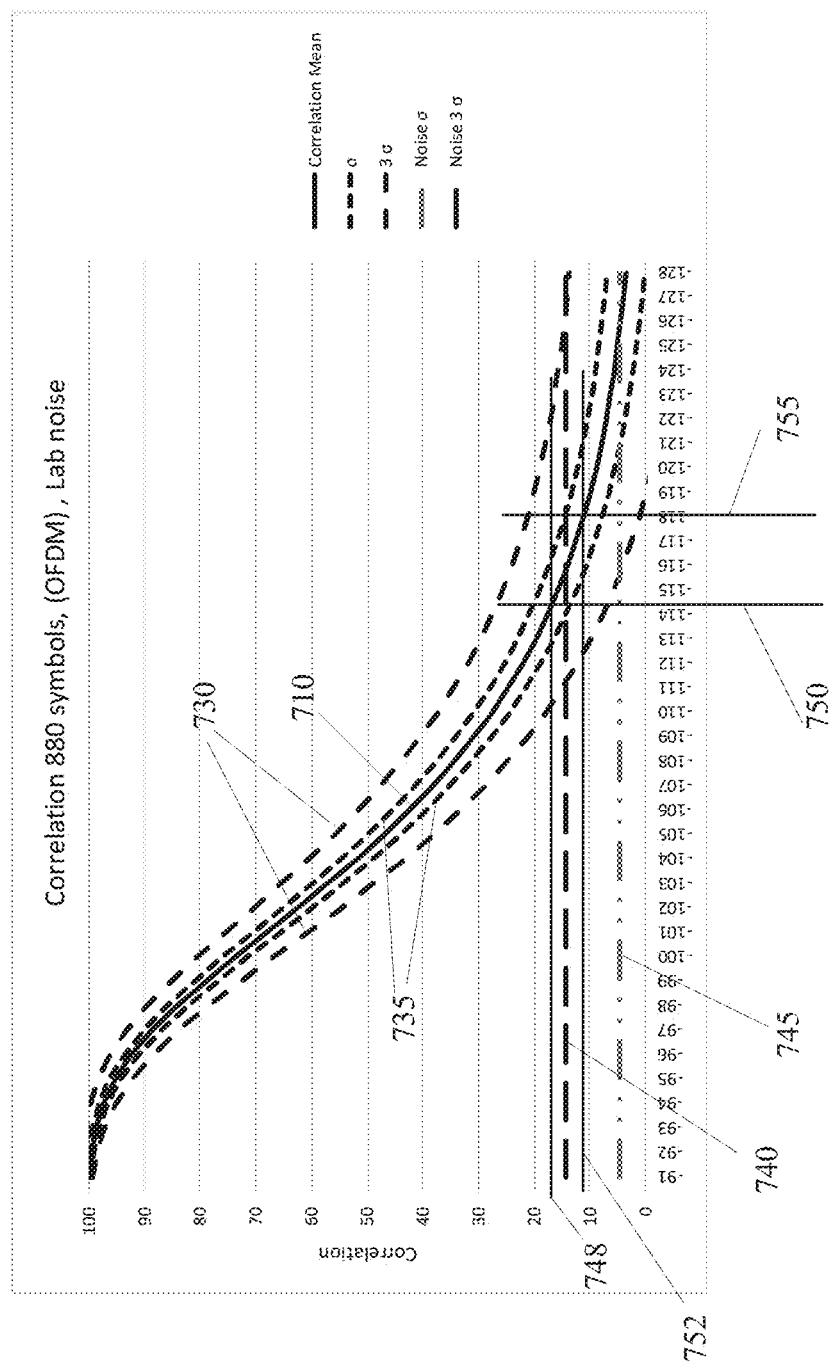
FIG. 7 is a graph of Correlation % versus received signal power Pr for M=880 symbols under laboratory, "Lab", conditions.

FIG. 7 is a graph of Correlation % versus received signal power Pr for M=880 symbols under laboratory, "Lab", conditions. For a given received signal strength Pr, the SNR is calculated using equation (5) assuming a noise figure of 3 dB. The SNR is used to determine the symbol error rate Ps using equation (4). The correlation mean 710 is calculated using equation (9). The one σ correlations 735 and the three σ correlations 730 plots are calculated using equations (9) and (10). The 3 σ and one σ values for noise, 14.3% and 4.8%, 740 and 745, respectively, are calculated using formula (11) and then multiplied by √2 to account for the 3 dB noise figure.

As discussed above with reference to FIG. 3, the correlation may be performed for the duration of a reception window Trw 360. As an example the duration of a reception window may be 50 μs and at a typical sampling rate of 20 MS/sec there may be 1000 correlation values in the reception window of which only one would correspond to the wanted. In order to be detected, the correlation peak of the wanted signal, the response packet 345, must be greater than the highest peak due to noise, but there are 1000 correlations due to noise. The Gumbel distribution may be used to describe the distribution of the maximum of a sample size k, where, for example n=1000. The probability that the singular signal correlation will exceed the highest of the all of noise correlations is found by integrating, over all correlations, the Gumbel probability distribution (of highest noise correlation) times the probability that the signal exceeds that correlation, i.e. (1−CDF).
The probability, Pw, that the wanted correlation is greater than the peak noise correlation is $$P_W = \int \mathcal{G}u(x;\mu,\beta) \cdot [1 - \mathcal{F}(x)] dx \quad (12)$$

Where $\mathcal{G}u(x;\mu,\beta)$ is the Gumbel PDF of noise with location μ, scale β for a value of n,
and $[1 - \mathcal{F}(x)]$ is the complement cumulative distribution function (1−CDF) of the normal distribution of the wanted signal correlation with mean and standard deviation as per equations (9) and (10).

Table 1 is an example showing the probability of the wanted correlation peak being higher than the maximum peak of the noise correlations as the correlation mean varies for thermal, lab and suburban noise conditions, for k=1000. The noise is assumed to be 3 dB higher than thermal for lab conditions, and 6 dB higher for suburban conditions.

TABLE 1

Probability that the Wanted correlation is greatest

| Corr Mean % | Prob Wanted Peak Wins % | | |
|---|---|---|---|
| | Thermal | Lab | Suburban |
| 50 | 100 | 100 | 100 |
| 45 | 100 | 100 | 100 |
| 40 | 100 | 100 | 100 |
| 35 | 100 | 100 | 99 |
| 30 | 100 | 100 | 97 |
| 25 | 100 | 99 | 79 |
| 20 | 99 | 88 | 32 |
| 15 | 87 | 45 | 4 |
| 10 | 40 | 7 | 0 |
| 5 | 5 | 0 | 0 |

Referring again to FIG. 7, in a burst, 451, of N=100 transmissions, with reference to Table 1, for a correlation mean of 16%, 748, there is about a 50% probability that the wanted peak is detected, or, in a burst of 100 transmissions, the wanted peak will be detected 50 times and a noise peak will win 50 times. This corresponds to a signal level of about −114 dBm 750. For a correlation mean of about 11% 752, there is a 10% probability that the wanted peak is detected, corresponding to a signal level of about −118 dBm 755. Dropping the correlation threshold from 16% to 11% increases the sensitivity by about 4 dB but out of the 100 results, only 10 will be the wanted peak and 90 will be noise peaks.

FIG. 7 represents the results using equations (4) to (10) which assume laboratory noise. In many scenarios the airborne measuring station 110 may be receiving many different signals from a large area on the ground, and the background noise level may be significantly higher than thermal noise and may be variable dependent upon the environment, i.e., open, rural, suburban or urban.

Figure 8:
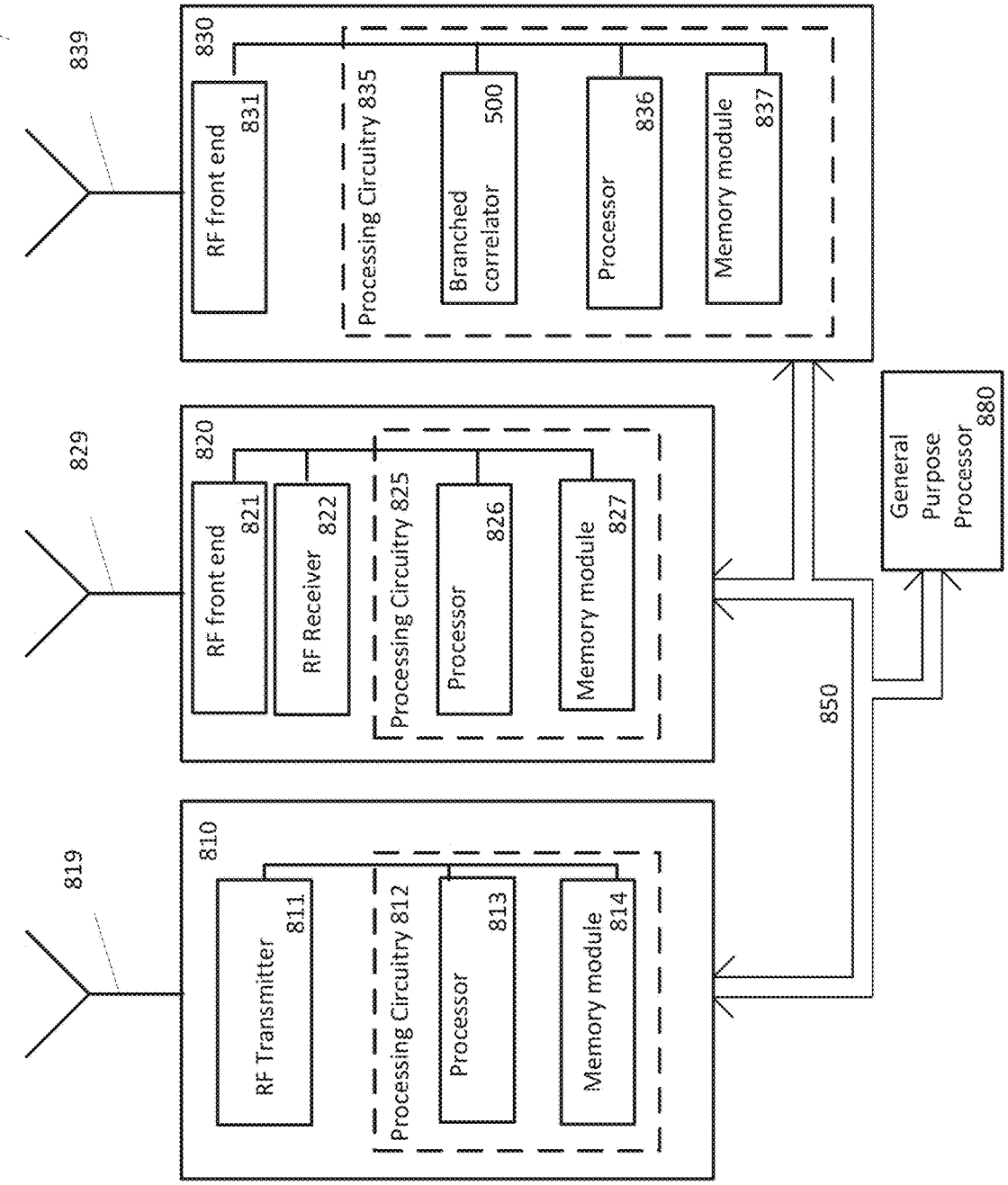
FIG. 8 illustrates a block diagram of an example wireless communication device which, according to an embodiment of the disclosure, may be used as all or as part of the measuring station.

FIG. 8 illustrates a block diagram of an example wireless communication device 800 which, according to an embodiment of the disclosure, may be used as all or as part of the airborne measuring station 110.

The wireless communication device 800 may be any device capable of wirelessly receiving signals and transmitting signals and may be configured to execute any of the methods of the IEEE 802.11-2016 Standard. Wireless communication device 800 may be one or more wireless devices that are based upon the IEEE 802.11 specification and each may be configured to act as a transmitter or a receiver. The embodiment described herein is that where wireless communication device 800 includes a wireless transmitter 810, a first wireless receiver 820 and a second wireless receiver 830. The wireless communication device 800 may also include a general purpose processor 880 which is interconnected to the three wireless devices 810, 820 and 830 by a data bus 850.

In some embodiments, the wireless transmitter 810 includes an RF transmitter 811 and processing circuitry 812 that includes processor 813, and memory module 814. The wireless transmitter 810 may also include one or more wireless antennas such as wireless antennas 819. The RF transmitter 811 may perform the functions of scrambling, encoding, interleaving, mapping pilot insertion, IFFT (inverse fast Fourier transform), guard interval insertion and I-Q modulation as described in IEEE 802.11-2016, and amplification for the transmission of the OFDM packets via the antenna 819. In some embodiments the processing circuitry 812 and/or the processor 813 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some functions of the RF transmitter 811 may be performed by the processing circuitry 812. The processing circuitry 812 may be configured to control any of the methods and/or processes described herein and/or to cause such methods, and/or processes to be performed, e.g., by the wireless transmitter 811. The memory module 814 may be configured to store data, programmatic software code and/or other information described herein. In some embodiments, the software may include instructions that, when executed by the processing circuitry 812, causes the processing circuitry 812 to perform the processes described herein with respect to the wireless transmitter 810.

In some embodiments, the wireless receiver 820 includes an RF front end 821, an RF receiver 822, processing circuitry 825 that includes a processor 826 and a memory module 827, and one or more wireless antennas such as wireless antenna 829. The RF front end 821 may perform the usual functions of an RF receiver front end such as low noise amplification, filtering and frequency down conversion, so as to condition the received signal suitable for inputting to the RF receiver 822. The RF receiver 822 may perform the Wi-Fi OFDM functions of I-Q demodulation, guard interval removal, FFT (fast Fourier transform), pilot removal, de-interleaving, de-mapping, decoding and descrambling so as to condition the received signal suitable for inputting to the processing circuitry 825. In some embodiments the RF receiver 822 and/or the processing circuitry 825 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions. In some embodiments some or all of the functions of the RF receiver 822 may be performed by the processing circuitry 825. The processing circuitry 825 may be configured to control any of the methods and/or processes described herein and/or to cause such methods, and/or processes to be performed, e.g., by the wireless receiver 820. The memory module 827 is configured to store data, programmatic software code and/or other information described herein. In some embodiments, the software may include instructions that, when executed by the processing circuitry 825, causes the processing circuitry 825 to perform the processes described herein with respect to the wireless receiver 820.

In some embodiments, the wireless receiver 830 includes an RF front end 831, processing circuitry 835 that includes a branched correlator 500, a processor 836 and a memory module 837, and one or more wireless antennas such as wireless antenna 839. Antennas 819, 829 and 839 may comprise just one or two antennas together with RF splitter/combiners. Of note, although FIG. 8 shows the branched correlator 500 as an element that is separate from the processor 836 and memory module 837, implementations are not limited to such. It is contemplated that the branched correlator 500, can be implemented using the processor 836 and the memory module 837. The RF front end 831 may perform the usual functions of an RF receiver front end such as low noise amplification, filtering and frequency down conversion so as to condition the received signal suitable for inputting to the processing circuitry 835. The conditioned received signal may first be inputted to the branched correlator 500. The branched correlator 500 may perform the time domain correlation of the response packet 345 as discussed above with reference to FIG. 5 and is further discussed below with reference to FIG. 9. In some embodiments the sampled received time domain symbols are correlated against 127 versions of the expected time domain response packet 345, each scrambled with one of the 127 scrambler seeds. The processor 836 may be configured to control any of the methods and/or processes described herein and/or to cause such methods, and/or processes to be performed, e.g., by the wireless receiver 830. The memory module 837 is configured to store data, programmatic software code and/or other information described herein. In some embodiments, the software may include instructions that, when executed by the processing circuitry 835, causes the processing circuitry 835 to perform the processes described herein with respect to the wireless receiver 830. In some embodiments the processing circuitry 835, may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions.

According to this embodiment of the disclosure, the wireless receiver 820 may be configured to measure and monitor an input signal's attribute, such as may include one or more of a ranging packet 340 transmitted by wireless transmitter 810, data and control packets, and the response signal 345, including control packets, transmitted by an access point or station that may be based upon the IEEE 802.11-2016 Standard. Such packets may include data null, ACK, RTS and CTS packets. The memory module 827 may store instructions for executing any method mentioned in the IEEE 802.11-2016 Standard, input signals, and results of processing by the processor 826, signals to be outputted and the like.

According to an embodiment of the disclosure, the RF transmitter 811 may be configured to transmit signals and the processing circuitry 812 may be configured to prepare the transmitted signal attributes based upon the IEEE 802.11-2016 Standard. Such transmitted packets may include data packets, control packets and management packets that are to be transmitted by a wireless station that is based upon the IEEE 802.11. Such control packets may include RTS and data null packets. The memory module 814 may store instructions for executing any method mentioned in the specification, input signals, and results of processing by the processor 813, signals to be outputted and the like.

According to another embodiment of the disclosure, the wireless receiver 820 may be configured to receive the transmissions of the wireless transmitter 810 and the processing circuitry 825 may be configured to monitor the attribute of the transmissions and determine the value of the time of departure of the transmissions from the wireless transmitter 810. These times may be accomplished by outputting a trigger that is timed to coincide with the reception of a packet from the wireless transmitter 810.

According to an embodiment of the disclosure, the wireless transmitter 810 may be configured to transmit packets to another wireless communication device and the processing circuitry 812 may be configured to prepare the attributes of the packet to be transmitted.

According to another embodiment of the disclosure, the wireless receiver 830 may be configured to receive the transmissions of another target station, e.g., target station 120, and the processing circuitry 835 may be configured to monitor an attribute of the transmissions of the other wireless communication device and determine the value of the time of arrival of packets from the other wireless communication device. These times may be accomplished by outputting a trigger that is timed to coincide with the reception packet from the other target station 120, e.g., wireless device or the wireless transmitter 810.

According to an embodiment of the disclosure, a general purpose processor 880 (e.g., a processor) may be used to control the operations of the wireless communications device 800 and in particular wireless transmitter 810, the wireless receiver 820, and wireless receiver 830. The general purpose processor 880 may also carry out the various calculations as described in this disclosure and may also prepare the measurement results for disclosure to an operator and/or user. In some embodiments, the general purpose processor 880 can be a computing device such as a tablet computer, desktop computer, laptop computer, or distributed computing, e.g., cloud computing. In some embodiments, the general purpose processor 880 can be a processor/CPU in the tablet, laptop computer, desktop computer, or distributed computing environment, etc. In some embodiments, the general purpose processor 880 may comprise integrated circuitry for processing and/or control, e.g., one or more processors and/or processor cores and/or FPGAs (Field Programmable Gate Array) and/or ASICs (Application Specific Integrated Circuitry) configured to execute programmatic software instructions and may include a memory module to execute programmatic code stored in the general purpose processor or another device. It is also noted that the elements of the wireless communications device 800 can be included in a single physical device/housing or can be distributed among several different physical devices/housings.

Figure 9:
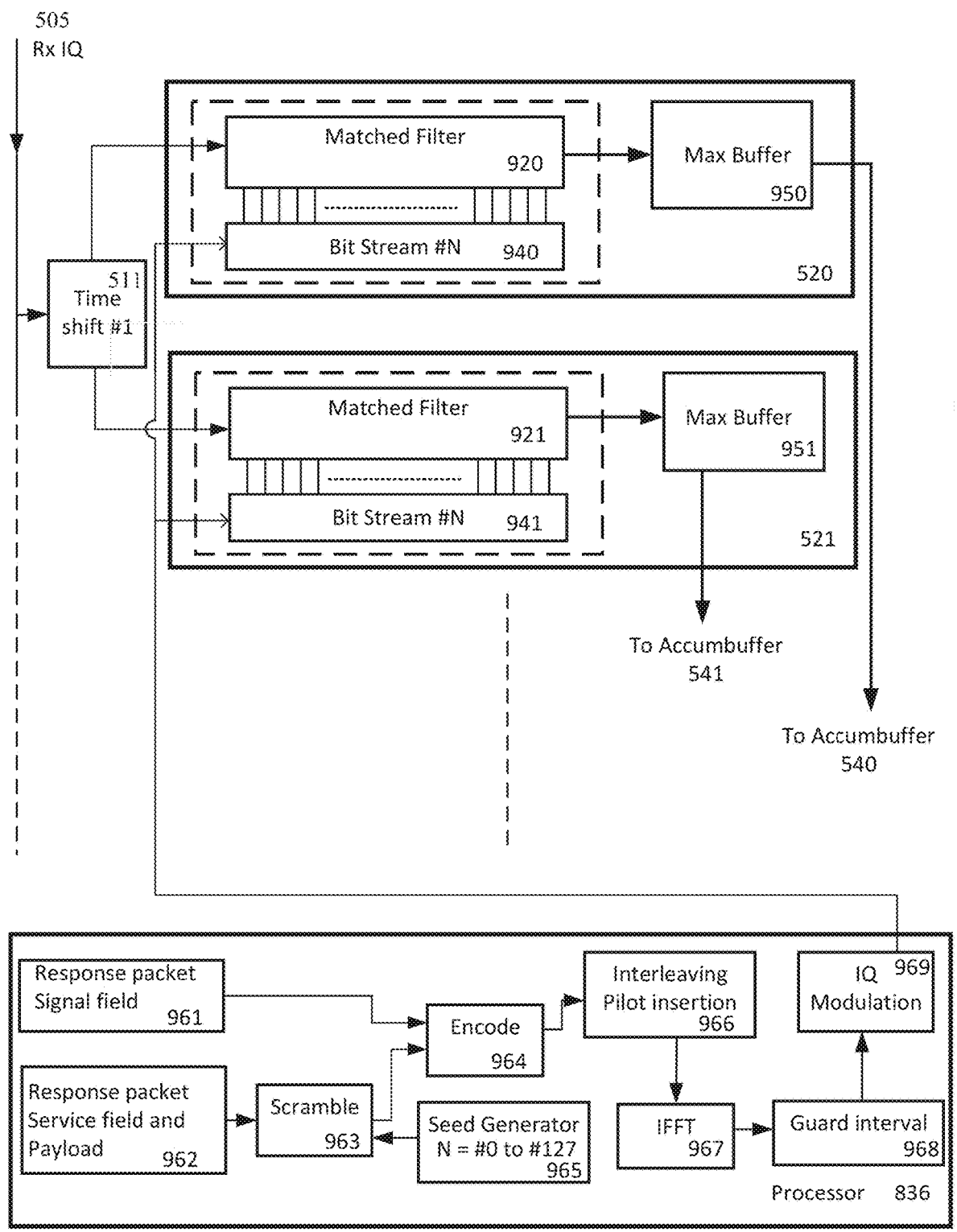
FIG. 9 illustrates a block diagram of part of an example branched correlator.

FIG. 9 illustrates a block diagram of part of an example branched correlator 500. Frequency shifter 511 and correlators 1 and 2, 520 and 521 are shown together with the block diagram of the generation of 127 versions of the response packet 345, one for each of the 127 scrambler seeds, that may be performed in the processor 836. It should be noted that a block diagram for each of the frequency shifters 512 to 518, together with their corresponding correlators 522 to 535, as shown in FIG. 5, is identical to the block diagram for frequency shifter 511 and correlators 520 and 521.

The complex received baseband sampled stream 505 is inputted to eight, frequency shifters 511 to 518 as discussed above with reference to FIG. 5. The blocks for the eight frequency shifters 511 to 518 are identical. Note that in FIG. 9 only frequency shifter 511 is depicted, although the present invention is not limited to identical frequency shifters or eight frequency shifters and can be any kind of shifter and/or any quantity of shifters. Each frequency shifter 511 to 518 is configured with an independent frequency shift value and outputs two sample streams, one with a positive frequency shift and one with a negative frequency shift. The sixteen frequency shifted sample streams are each fed into independent correlation blocks 520 to 535. The positive time shift output from frequency shifter 511 is fed into correlation block 520, and the negative time output shift from frequency shifter 511 is fed into correlation block 521. The positive shift outputs from frequency shifters 512, 513, 514, 515, 516, 517 and 518 are fed into correlation blocks 522, 524, 526, 528, 530, 532, and 534, as shown in FIG. 5. The negative shift outputs from frequency shifters 512, 513, 514, 515, 516, 517 and 518 are fed into correlation blocks 523, 525, 527, 529, 531, 533, and 535, as shown in FIG. 5. The correlation blocks for the sixteen correlation blocks 520 to 535 are identical, but note that in FIG. 9 only correlation blocks 520 and 521 are depicted.

In this embodiment, in processor 836 the expected raw bits for the entire response packet 345 are constructed and then I-Q modulated. The response packet 345 Service field 630 and Payload bits 640 are constructed in block 962, and then scrambled in block 963 with a seed that is inputted from block 965. The response packet 345 Signal field 620 is constructed in block 961. In block 964 the Signal field bits are added to the scrambled System field and payload bits and then encoded. The functions of interleaving and pilot insertion are performed by pilot insertion 966 and then an inverse fast Fourier transform IFFT carried out in IFFT 967. The guard interval is inserted at guard interval insertion 968 and then, the I-Q modulation 969 takes place so as to produce a baseband time domain complex bit stream of the response packet 345, corresponding to the seed selected from block 965. The OFDM modulation functions including interleaving and pilot insertion 966, IFFT 967, guard interval insertion 968 and, I-Q modulation 969 are as described in the IEEE 802.11-2016 Standard.

In correlation block 520, the sampled baseband positive frequency shifted received complex bit stream, from frequency shifter 511, is shifted into the general-purpose matched filter 920 and correlated with the sampled baseband time domain complex bit stream of the response packet 345, outputted from processor 836, block 969 and shifted into bit stream block 940. The resulting correlation is shifted into the max buffer 950. In order to correlate against all 127 scrambler seeds, the matched filter 920 may hold the complex bit stream of the received signal for the duration of the reception window 360, while the processor 836 generates each of the 127 complex bit streams of the expected response packet 345 corresponding to each of the 127 scrambler seeds, in turn. For each scrambler seed the correlation output of the matched filter 920 is shifted into max buffer 950 which maintains the maximum correlation for each sample, for each scrambler seed. When all 127 seeds have been used, the max buffer 950 contains the maximum correlations which, assuming that the response packet 345 was received, theoretically may correspond to the correlation of the response packet 345, generated by processor 836, with the same scrambler seed that was used to generate the response packet 345 in the target station 120. The output from the max buffer 950 is then passed to the accumulator buffer 540.

Similarly, in correlation block 521, the baseband negative frequency shifted received complex bit stream, from frequency shifter 511, is correlated in the matched filter 921 with 127 versions of the baseband time domain complex bit stream of the response packet 345, outputted from processor 836, block 969 and shifted into bit stream block 941. When all 127 seeds have been used, the max buffer 951 contains the maximum correlations which, assuming that the response packet 345 was received, theoretically may also correspond to the correlation of the response packet 345 with the same scrambler seed that was used to generate the response packet 345 in the target station 120. The output from the max buffer 950 is then passed to the accumulator buffer 541.

The block diagrams for correlators blocks 522 to 535 are similar to those described above for correlators blocks 520 and 521.

In another embodiment, for each correlator 520 to 535, 127 parallel correlators, each comprising a matched filter and bit stream, may be used, and processor 836 generates all 127 scrambled bit streams, one for each of the parallel correlators.

Expressed another way, if, in a reception window, there are K samples, then in a reception window there are K correlations for each scrambler seed s.

Hence, for each seed, s, in branch b, the correlations $C_{b,s} = \{c_{b,1,s}, c_{b,2,s}, \ldots c_{b,K,s}\}$ After all 127 scrambler seeds have been correlated:

For s=1 to 127, for k=1 to K $m_{b,k}$=MAX $\{c_{b,k,s}\}$ $M_b$ is stored in each Max Buffer, e.g., 950, 951, where $M_b = \{m_{b,1}, m_{b,2}, \ldots, m_{b,K}\}$, where $m_{b,k}$ is the maximum correlation for sample k, after all 127 seeds have been correlated.

For example, with reference to FIG. 9, for branch b=1, after all 127 seeds have been correlated in matched filter 920, the result $M_1$ is stored in the Max Buffer 950.

The process of "additive correlation" across bursts is now described.

For each exchange of the ranging and response packets, 340 and 345 respectively, as described above with reference to FIG. 3, an RTT may be measured by correlation with the known time domain samples of expected response signal 345, frequency shifted and scrambled, as described above with reference to FIGS. 5 and 9. For example, a correlation threshold may be selected and if the received symbol stream correlates above this threshold then the time of reception of the response packet 345 may be measured and compared to the time that the ranging packet 340 was transmitted in order to produce an RTT. In order to increase sensitivity, the correlation threshold might be set to a low value, but, as described above with reference to FIG. 7, this increases the possibility of false correlations due to noise and other interfering Wi-Fi signals. As described above with reference to FIG. 4 a series of bursts of transmissions may be used. "Additive correlation" exploits the likelihood that the wanted response packets 345 will occur at the same time in each reception window 360 for each of the N transmissions during a burst. The process is to combine the results from all the windows in a burst so as to accumulate the "wanted" correlation peaks that occur around the same time in each window while rejecting the other "unwanted" correlation peaks which will be occurring at random times in each window.

Assuming that the sampling rate is S samples per second, a correlation value may be produced for every sample. During the reception window 360, correlation values, Cn, may be derived for every sample.

With reference to FIGS. 5 and 9, after correlating the received symbols in a reception window, with each sampling seed, s, and taking the maximum correlation per symbol, the resulting correlations are, $M_b$ where $M_b = \{m_{b,1}, m_{b,2}, \ldots m_{b,K}\}$ b is the branch of the branched correlator 500, and K is the number of symbols in the reception window In branch b, reception window, n, $M_{b,n} = \{m_{b,n,1}, m_{b,n,2}, \ldots m_{b,n,K}\}$ Additive correlation, AC, is the sum of all the reception windows in a burst, $AC_b = \{ac_{b,1}, ac_{b,2}, \ldots ac_{b,K}\}$ (13)

Where, For k=1 to K, $ac_{b,k} = \sum_{n=1}^{N} M_{b,n}$

Where K is the number of correlations in a reception window, and N is the number of packets in a burst. With reference to FIG. 5, the sum of the reception windows in a burst, as stored in the accumulator buffer for branch b, is $AC_b$. For example, for b=1, the K correlations in accumulator buffer 540 is $AC_1$, and for b=16, the K correlations in accumulation buffer 555 is $AC_{16}$.

Figure 10:
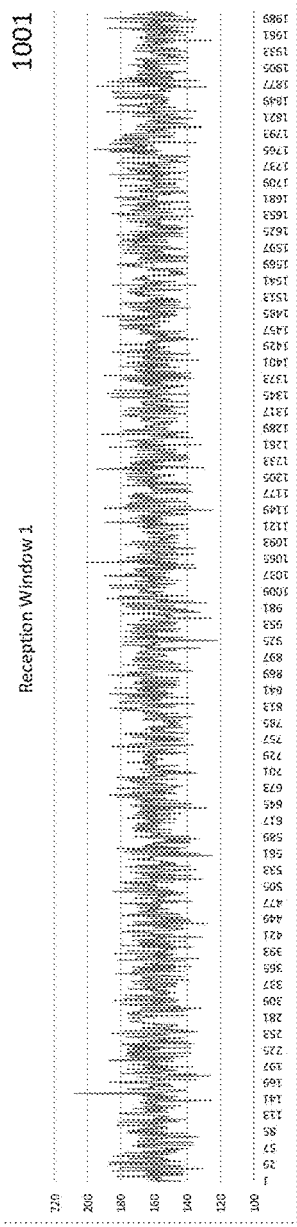
FIGS. 10, 11, 12, 13 and 14 are a set of plots that illustrate the combining of detection windows.
Figure 11:
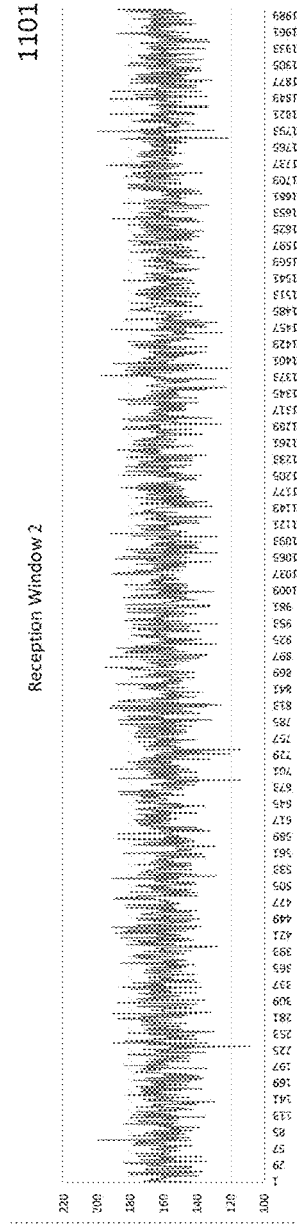
Figure 12:
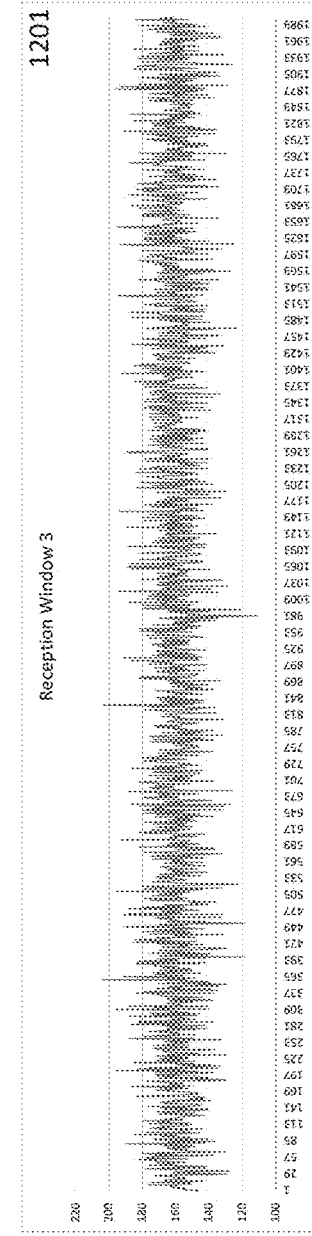
Figure 13:
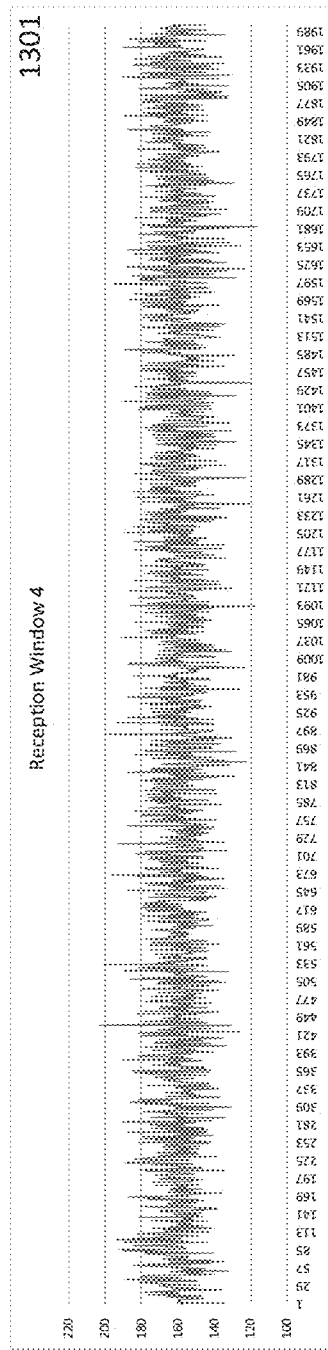
Figure 14:
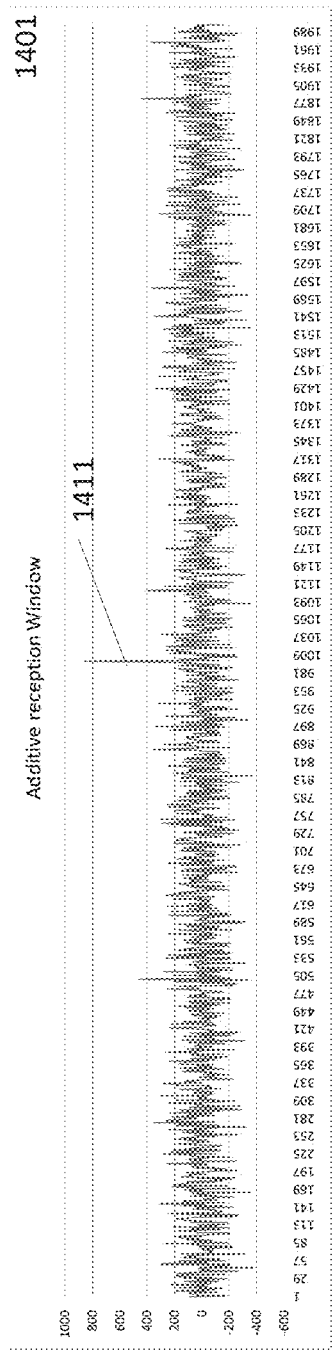

Again with reference to FIG. 5, the maximum correlation for each sample in each accumulator buffer 540 to 555, is selected in block 560. Hence, the maximum correlation, $\mathcal{M}_k$, across all the accumulator buffers 540 to 555, For b=1 to B, for k=1 to K, $\mathcal{M}$=MAX $\{ac_{b,k}\}$ FIGS. 10, 11, 12, 13 and 14 are a set of plots that illustrate the combining of detection windows. FIG. 10 plot 1001, FIG. 11 plot 1101, FIG. 12 plot 1201, and FIG. 13 plot 1301 are graphical representations of the output of the correlator 520, across the first four reception windows 360, respectively, of a burst 451. FIG. 14 plot 1401 is a graphical representation of the addition of the outputs of 100 such reception windows, as stored in accumulator buffer 540. The wanted correlation peak 1411 in this example is above the unwanted peaks in the additive reception window plot 1401 but in each of the individual reception windows plots, 1001, 1101, 1201, 1301, the wanted correlation peak is not the maximum peak. FIGS. 10 to 14 show that by summing the results of all the correlations in the reception windows of a burst, the wanted correlation peak 1411, which is at a constant time compared to the noise peaks which are at random times, may be found, even where the wanted peak is smaller than the noise peaks in each individual reception window.

Figure 15:
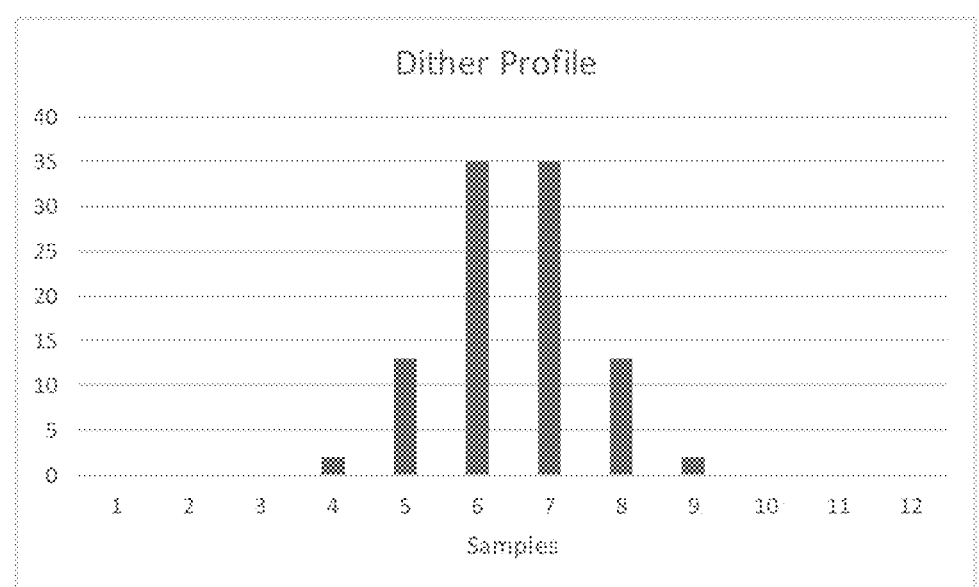
FIG. 15 is an example histogram of a typical dither profile of a Wi-Fi target station.

In the general sense, Wi-Fi target stations, 120, will exhibit a dither in their turnaround time, ($t_{SIFS}$) 332, resulting in a jitter between the relative timing of the correlation peaks. FIG. 15 is an example histogram of a typical dither profile of a target station 120, e.g., a Wi-Fi target station.

Figure 16:
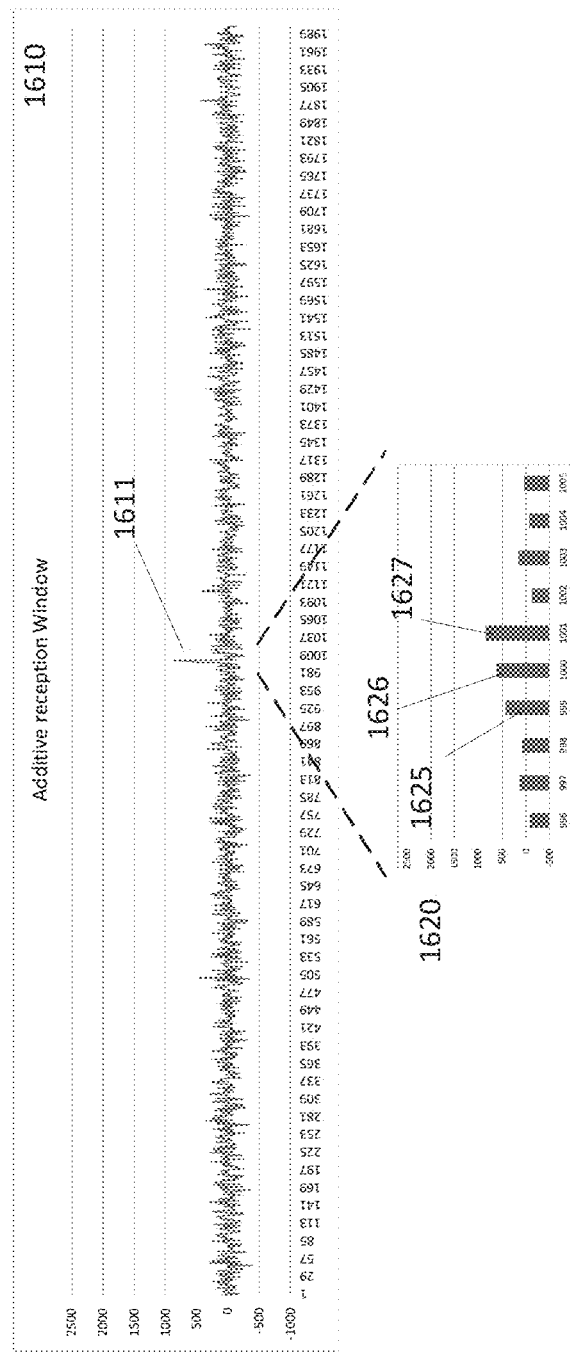
FIG. 16 shows a reproduction of a plot in FIG. 14, with a different y-axis, together with a plot that is an expanded view of the plot around the wanted peak.

FIG. 16 shows plot 1610, which is a reproduction of plot 1401 with a different y-axis, together with Plot 1620, which is an expanded view of the plot 1610 around the wanted peak 1611. Due to the dither of the target station 120, as discussed above with reference to FIG. 15, the simple summation process results in a number of peaks 1625, 1626, and 1627.

A rolling sum, RS, may be applied to the additive correlation, $AC_1$ that is stored in the accumulator buffer 540 as represented by plot 1401.

$$\text{For } k = \frac{(s-1)}{2} \text{ to } K - \frac{(s-1)}{2} \quad RS_k = \sum_{k-\frac{(s-1)}{2}}^{k+\frac{(s-1)}{2}} ac_{b,i} \quad (14)$$

Where s is the rolling sum window, i.e. the number of samples that are summed.

Figure 17:
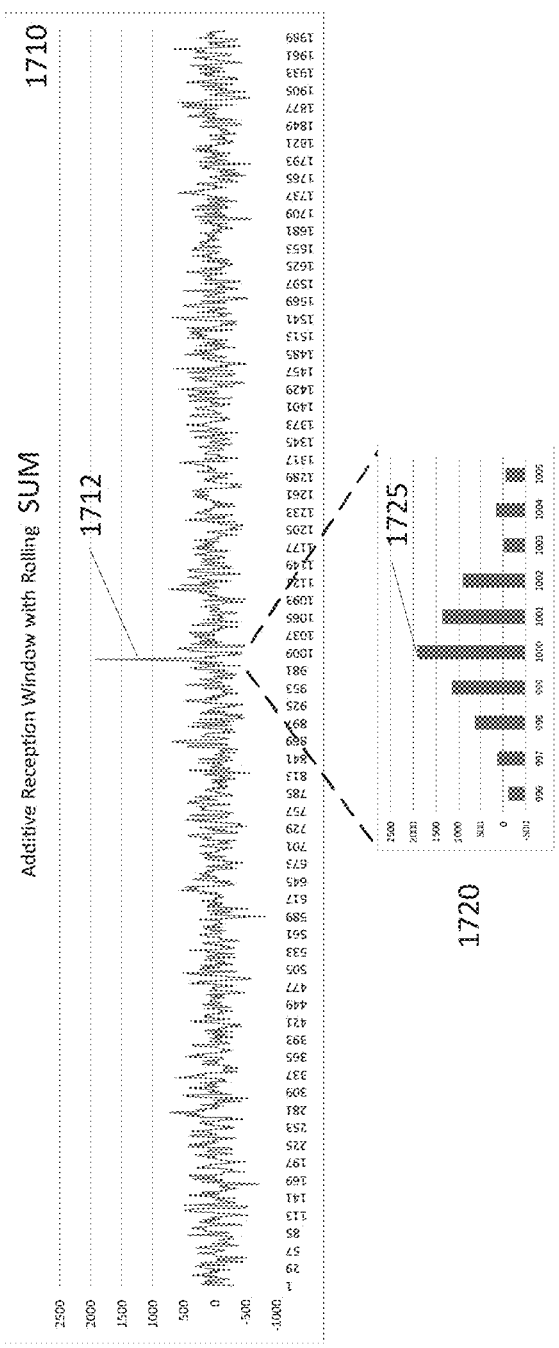
FIG. 17 is a graphical representation containing plots of the summation of the same correlations that resulted in plots in FIG. 16, but where a rolling sum is applied to the additive correlation as described above with reference to equation (14)

FIG. 17 is a graphical representation containing plots 1710 and 1720 of the summation of the same correlations that resulted in plots 1610 and 1620, but where a rolling sum is applied to the additive correlation as described above with reference to equation (14). Summing the 100 correlations, after applying the rolling sum, results in the wanted peak 1712. It is noted that the peak 1712 is significantly higher that the peak 1611. Plot 1720 is an expanded view of the plot 1710 around the peak 1712. In this example, a rolling sum window with s=3 is used. Hence, the maximum peak, 1725 is the sum of peaks 1625, 1626, and 1627. Thus peak 1725 is the maximum of peak 1712 and is about twice as large as the peak 1611.

In the discussion above of the rolling sum, for the purposes of explanation, the rolling sum is applied on the samples in the accumulator buffer 540. As discussed above, with reference to FIGS. 5 and 9, in one embodiment of this disclosure, the rolling sum may be applied after the maximum samples, from each of the accumulator buffers 540 to 555 are selected in block 560. In yet another embodiment of this disclosure, the rolling sum may be carried out on the samples in each accumulator buffer 540 to 555, and then the maximum samples selected in block 560, and the result passed directly to the result buffer 580.

Figure 18:
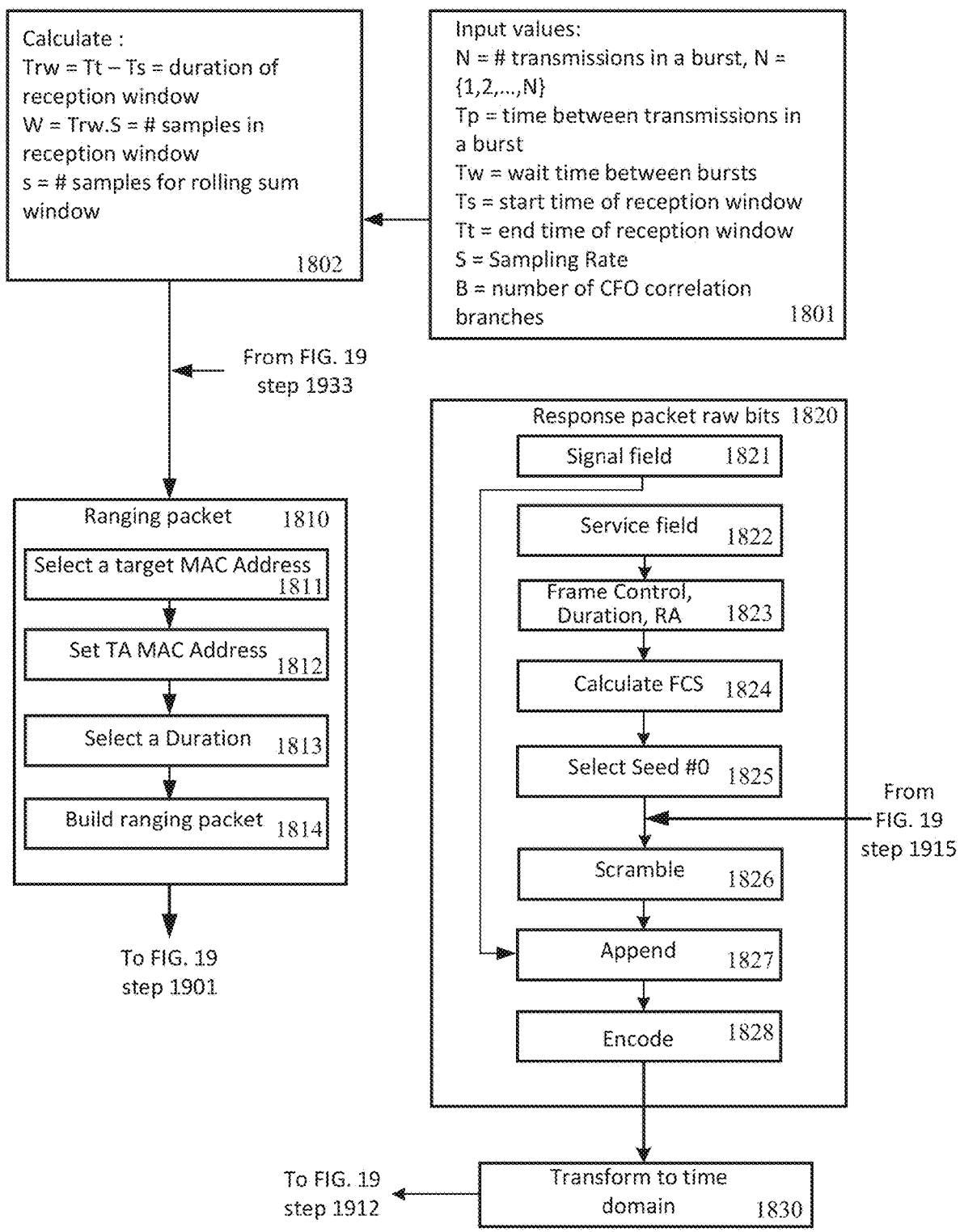
FIGS. 18 and 19 are a flow diagram of an example geo-location process as described in FIG. 3, utilizing the example wireless communication device which according to an embodiment of the disclosure may be used as or as part of the airborne measuring station.
Figure 19:
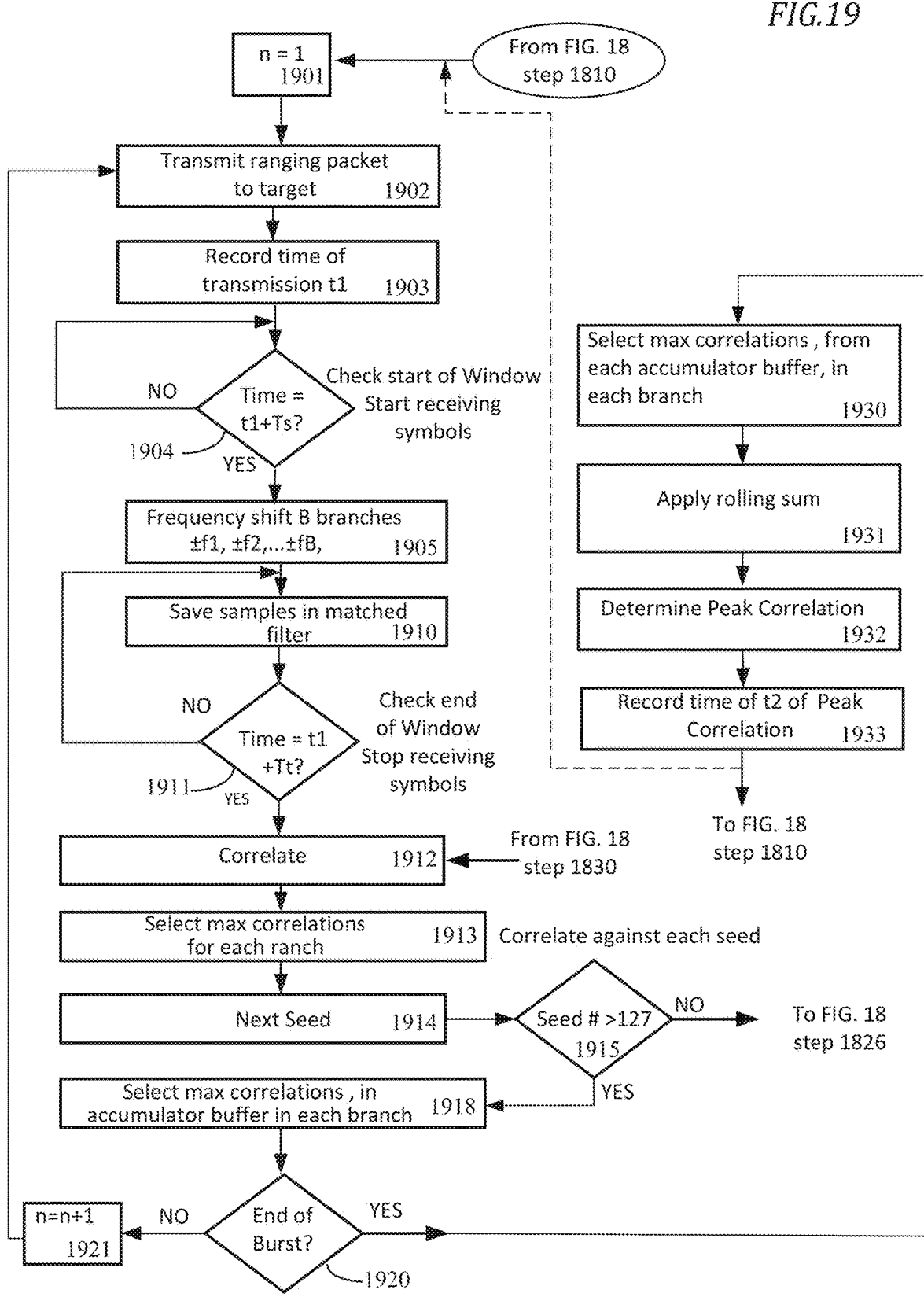

FIGS. 18 and 19 are a flow diagram 1800 of an example of one embodiment of the geo-location process as described in FIG. 3, utilizing the example wireless communication device 800 which according to an embodiment of the disclosure may be used as or as part of the airborne measuring station 110. The process may start with step 1801 where a number of values may be inputted. These values may be inputted, e.g., via the general purpose processor 880, to the processing circuitries 812, 825, and 835 in the wireless communication device 800 which according to an embodiment of the disclosure, may be used as all or as part of the airborne measuring station 110. In some embodiments, the values inputted may include:

N, the number of transmissions in a burst;
Tp, 350, the time between transmissions in a burst;
Tw, 471, the wait time between bursts;
Ts, 310, the start time of the reception window;
Tt, 320, the end time of the reception window;
S, the sampling rate; and
B, the number of branches in the branched correlator 500

At step 1802 certain values may be calculated. In some embodiments, the calculated values may include:

Trw, 360, the duration of the reception window, Trw=Tt−Ts;
K, the number of samples in the reception window, K=Trw·S; and
s, the number of samples for rolling sum window.

These calculations may be performed by the processing circuitry 835 in the wireless receiver 830.

At step 1810 the ranging packet 340 is built. Step 1810 may be performed by the processing circuitry 812 in the wireless transmitter 810. Step 1810 may include steps 1811, 1812, 1813, and 1814. At step 1811, the MAC address of the target station 120 is selected and at step 1812 the MAC address to be used in the ranging packet 340 may be set. In the corresponding response packet 345, this MAC address will be the RA 643. At step 1813 a duration value may be selected for the MAC header of the ranging packet 340. This sets the value of the duration field 642 expected in the response packet 345. The value of the duration field 642 in the response packet 345 will be equal to the value of the duration field in the ranging packet 340 minus SIFS minus the length of the response packet 345. Hence, by setting a known specific value in the duration field a unique value for the duration field in the response packet 345 may be set. Step 1813 may be followed by step 1814 where the MAC header and payload for the ranging packet 340 is constructed.

Step 1810 may be followed by step 1901 in FIG. 19, where the value for a variable n is initialized. The ranging packet 340 may be transmitted at step 1902. Step 1902 may include taking the MAC Header and payload constructed in step 1814, adding the preamble and header, and then scrambling, spreading and modulating the bits as performed by the RF transmitter 811 described in FIG. 8. The time t1 of transmission of the ranging packet 340 is recorded at step 1903. Step 1903 may be performed by wireless receiver 820.

At step 1820 the expected raw bits for the response packet 345 may be determined. The determination of these raw bits may be performed by the processing circuitry 835 and may be based upon inputs from the general purpose processor 880 and/or the processing circuitry 812. Step 1820 may start with step 1821 where the 24 raw bits of the signal field 620 (rate, length and parity) are set. At step 1822, the service field 630 may be constructed by block 961 part of the processing circuitry 835. At step 1823 the frame control 641, duration 642 and RA 643 fields are constructed. The frame control field 641 will be set to correspond to the type of response packet 345 that is expected, e.g., CTS or ACK. The duration field 642 will be based upon the duration set in the ranging packet at step 1813. The RA field 643 will correspond to the TA MAC address set in step 1812. At step 1824 the 16 bit FCS field 644 is calculated over the frame control 641, duration 642, and RA 643 fields. At step 1825 an initial scrambler seed may be selected. The IEEE 802.11 Standard specifies that the scrambler is initiated with a pseudorandom nonzero seed (excluding all zeros), hence the initial scrambler seed that may be selected could be, for example, 0000001 binary. At step 1826 the service 630 and payload 640 fields are scrambled using the scrambler seed selected either in step 1825 or selected at step 1914. At step 1827 the signal field from step 1821 is appended to the scrambled service and payload fields from step 1827 forming a 152-bit sequence. At step 1828 the 152-bit sequence formed in step 1827 is encoded to create the 304 bit sequence that corresponds to the expected received packet 325 bit stream, scrambled using the seed selected either in step 1825 or in step 1914.

At step 1830, the complete response packet bit stream is transformed to the time domain. The time domain representation of the packet is specified in the Standard. For example, the short and long training sequences of the preamble are specified in the Standard, clause 17.3.3., together with the time domain representation, Annex 1.1.3. Similarly, the signal field encoding is described in Clause 17.3.4 of the Standard, and the generation of the signal field, together with the time domain representation is described in Annex 1.1.4 of the Standard.

After having transmitted the first ranging packet 340 in step 1902 and having recorded the time of transmission in step 1903, at step 1904 it may be determined if the reception window 360 has opened. If a time of Ts 310 has elapsed since the recording of the time of transmission t1 of the ranging packet 340 in step 1903, then at step 1905 the received time domain samples may be shifted in frequency as described above with reference to FIG. 5 so as to produce B frequency shifted time domain sample sets which may, in step 1910, be saved in a matched filter, e.g., matched filter 920. While the reception window 360 is open, for each of the B branches, the received frequency shifted time domain sample sets may be saved, as discussed above with reference to FIG. 9, in the respective matched filter of each branch of the branched correlator 500. For example, for branch 0 and correlator 0 520, the sample set is saved in matched filter 920. At step 1911, by checking if the elapsed time since the transmission time t1, of the ranging packet 340 in step 1903, is greater than Tt 320, it may be determined if the reception window 360 has closed.

At step 1912, the saved samples in the matched filter of each branch of the branched correlator 500 are correlated against the time domain samples, from step 1830, of the wanted response packet. The resulting correlations are then stored (step 1913). At step 1914 a new scrambler seed is selected, a check is made at step 1915 if the number of scrambler seeds already selected exceeds 127, and if not, then at step 1826 the wanted response packet is scrambled with the next seed. In the loop of steps 1912, 1913, 1914 and 1915, the samples for one reception window, as saved in the matched filter, are correlated against all 127 scrambled versions of the response packet 345, and at step 1913, the maximum value for each sample is saved. For example, when, at step 1915 it is determined that all the scrambler seeds have been used, as discussed above with reference to FIG. 9, for branch correlator 0 520, the maximum correlations for each sample are stored in the Max Buffer 950 and these maximum correlations should include the correlation of the wanted response packet coinciding to the correct scrambler seed. If, at step 1915, it is determined that all the 127 scrambler seeds have been used, then at step 1918, the correlations for that branch for that reception window are passed to the accumulation buffer for that branch. For example, for branch correlator 0 520, the correlations in max buffer 950 are then passed to accumulation buffer 540. Similarly, accumulation buffers 541 to 555 will contain the maximum correlations across all the scrambler seeds for that reception window.

At step 1920, a check may be made to determine if the burst of N has completed. If not, then at step 1921 n is incremented and the process returns to step 1902 where another ranging packet 345 is transmitted. As subsequent response packets are received and correlated, the correlations in the accumulation buffers are summed, "additive correlation", as discussed above with reference to FIGS. 10, 11, 12, 13 and 14 and equation (13). The end of a burst may be determined by several means. If, at step 1920, the value of n is noted to be N, then that would indicate the end of a burst. In the unlikely event that a ranging packet transmission was not noted in step 1903, then a gap in the time between the transmission times, in the order of the wait time Tw 471, may be used. If, at step 1920 it is determined that the burst of N ranging packets has ended, then the correlations in each accumulation buffer, of each branch of the branched correlator 500, contain the additive correlations as discussed above with reference to FIGS. 10, 11, 12, 13 and 14 and equation (13) for that burst of N packets. For example, with reference to FIG. 5, the additive correlations are contained in accumulation buffers 540 to 555.

At step 1930, for each sample, for each accumulation buffer, the maximum correlation may be selected. Referring to FIG. 5, the maximum correlation per sample may be stored in the max per sample block 560. At step 1931, a rolling sum may be applied across the maximum of the additive correlations in block 560 step 1930. Applying the rolling sum window is described above with reference to FIG. 17 and equation (14). At step 1932, the peak correlation, $P_c$, of the additive correlations after the rolling max has been applied, may be determined. Then, at step 1933, the time, t2 of the reception of peak Pc is recorded, where t2 may be the time elapsed since the start of the reception window. The effective RTT for that burst may then be calculated and used in geo-location calculations.

The process may then return to step 1810 where another ranging packet may be created to start a new burst with a different ranging packet 340, or alternatively, may return to step 1901 if the same ranging packet is to be used for the next burst, or, the process may terminate.

Figure 20:
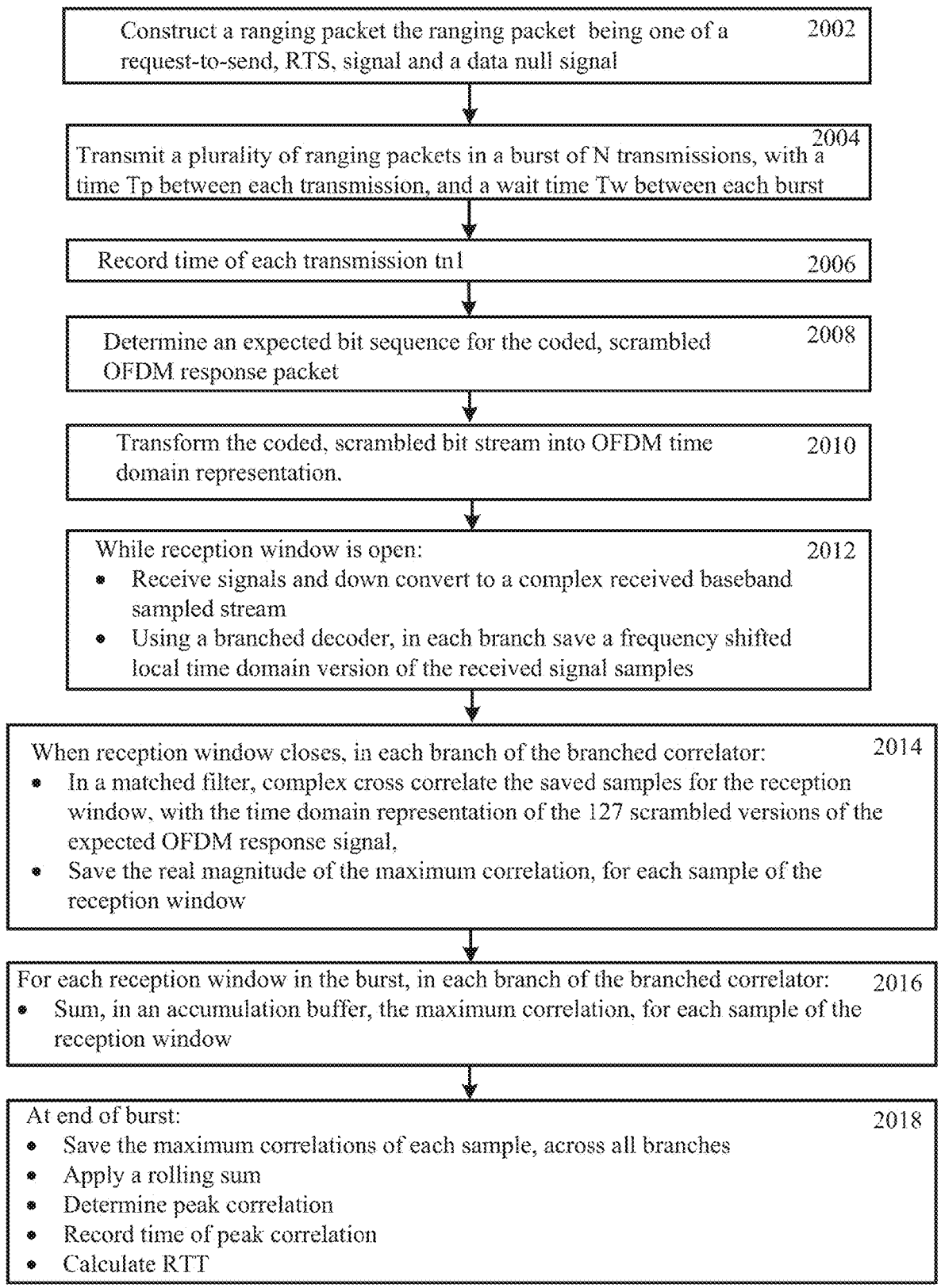
FIG. 20 is a flowchart of an example process for determining an RTT at a first wireless device, such as an airborne station, of a second wireless device, such as a mobile ground station.

FIG. 20 is a flowchart of an exemplary process 2000 for determining an RTT at a first wireless device, such as an airborne station, of a second wireless device, such as a mobile or stationary ground station. The process includes constructing, via the processing circuitry 812 in RF transmitter 810, a ranging packet 340. The ranging packet 340 being one of a request-to-send, RTS, signal and a data null signal (step 2002). At step 2004, via the RF transmitter 811, a plurality of ranging packets 340 are transmitted in a burst of N transmissions, with a time Tp 350 between each transmission, and a wait time Tw 471 between each burst 451, and, then at step 2006, a time tn1, is recorded for each transmitted ranging packet, where n is the number of the transmission in the burst of N. At step 2008, the expected bit sequence for the coded, and scrambled OFDM response packet 345 is determined, via processing circuitry 835, as discussed above with reference to FIG. 8. As there are 127 possible scrambler seeds, there are 127 versions of the response packet 345 OFDM signal bit stream. At step 2010, via the processing circuitry 835, the coded, scrambled OFDM signal bit stream of the response packet is then transformed into the time domain.

The process includes, at step 2012, detecting the opening of the reception window 360 and while the reception window is open, via receiver front end 831, receiving signals and down converting to a complex baseband sampled stream. The reception window opens a time Ts 310 after time tn1. The branched decoder 500, as discussed above with reference to FIG. 5, then produces 16 frequency shifted local time domain versions of the complex baseband sampled stream, the samples being passed into a matched filter, for example, as depicted in FIG. 9, matched filter 920 in correlator 520.

When the reception window closes, step 2014, in each branch of the branched correlator 500, the received complex baseband sampled stream in the matched filter is cross correlated, in turn, with each of the 127 versions of the coded, scrambled OFDM signal bit streams of the response packet 345 that are transformed into the time domain at step 2010. The real magnitude of the cross correlation for each sample in the reception window is passed to a max buffer, for example the output of the matched filter 920 is passed to max buffer 950. As each of the 127 time domain versions of the response packet is cross correlated, the value of each sample is compared to the corresponding value in the max buffer and if greater, replaces the value in the max buffer. Hence, for each seed, s, in branch b, $$C_{b,s} = \{c_{b,1,s}, c_{b,2,s}, \ldots c_{b,K,s}\}$$

For $s=1$ to 127, for $k=1$ to K $m_{b,k}$=MAX $\{c_{b,k,s}\}$

Thus, after all 127 seeds have been used, the result, $M_b$ is stored in each max buffer, where $$M_b = \{m_{b,1}, m_{b,2}, \ldots m_{b,K}\}$$

At step 2016, for each reception window n, after all 127 seeds have been used, in each branch b, the result $M_{b,n}$ in the max buffer is added to the previous n−1 results in the accumulation buffer, as discussed above with reference to "additive correlation" and FIGS. 10, 11, 12 and 13. When, in step 2018, it is determined that the burst is complete, i.e., N ranging packets 340 have been transmitted, the correlation values in the accumulation buffer in each branch is $AC_b$, as follows:

In branch b, reception window, n, $M_{b,n} = \{m_{b,n,1}, m_{b,n,2}, \ldots m_{b,n,K}\}$ Additive correlation, AC, is the sum of all the reception windows in a burst, $$AC_b = \{ac_{b,1}, ac_{b,2}, \ldots ac_{b,K}\}$$

Where, For k=1 to K, $ac_{b,k} = \Sigma_{n=1}^{N} M_{b,n}$

Where K is the number of correlations in a reception window, and

N is the number of packets in a burst.

At step 2018 the maximum value of each corresponding sample in the accumulator buffer of each branch is determined and placed in the max per sample block 560.

For $b=1$ to $B$, for $k=1$ to $K$, $\mathcal{M}_k = \text{MAX } \{ac_{b,k}\}$ $\mathcal{M} = \{\mathcal{M}_1, \mathcal{M}_2, \mathcal{M}_3, \ldots \mathcal{M}_K\}$ A rolling sum is then applied:

$$\text{For } k = \frac{(s-1)}{2} \text{ to } K - \frac{(s-1)}{2} \quad RS_k = \sum_{k-\frac{(s-1)}{2}}^{k+\frac{(s-1)}{2}} \mathcal{M}_k$$

Where s is the rolling sum window, i.e., the number of samples that are summed.
The peak value, $P_c$ is then determined: $Pc = \text{MAX } \{RS_k\}$
The time corresponding to the peak, t2, is recorded and then the RTT for that burst determined.

Figure 21:
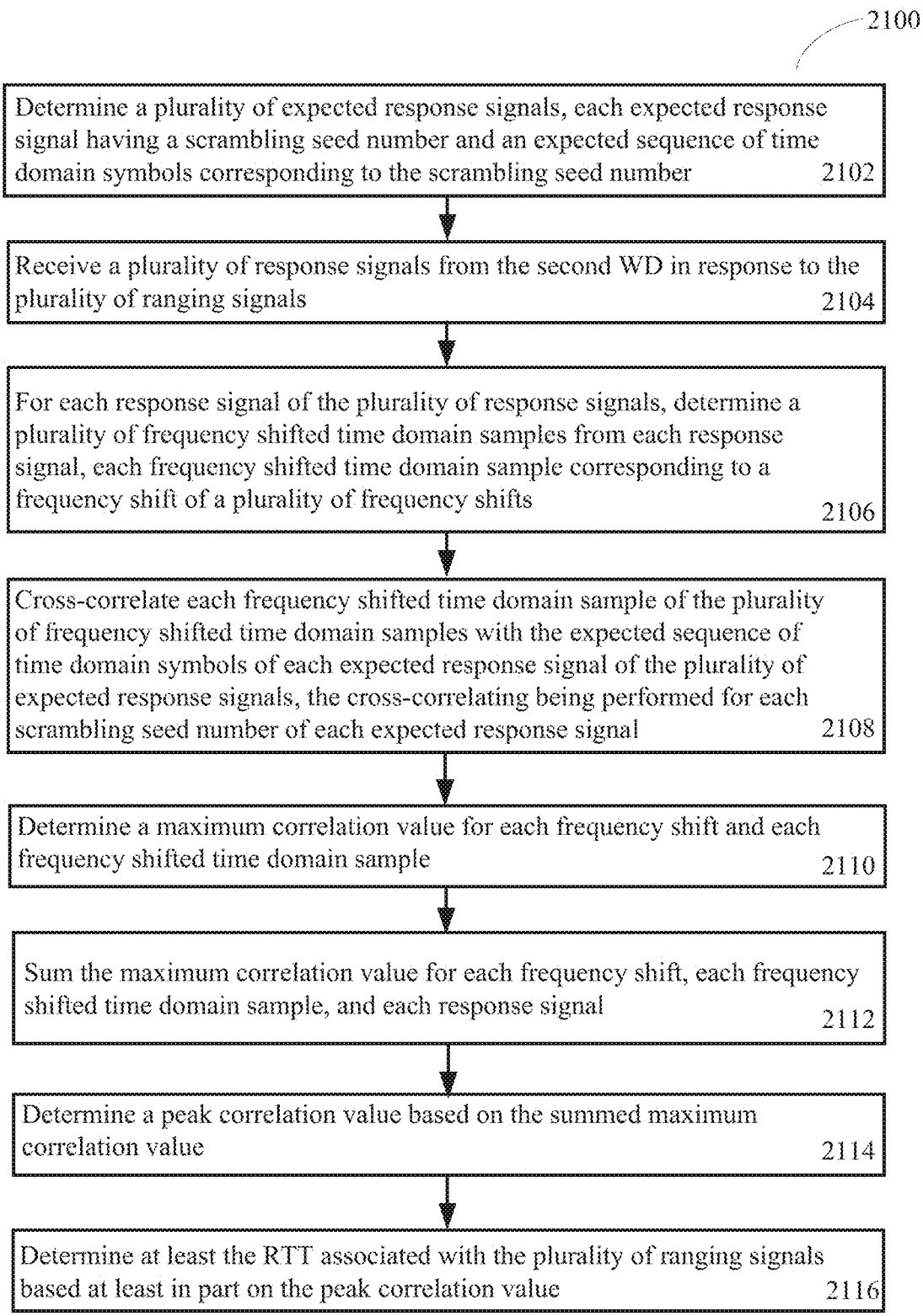
FIG. 21 is a flowchart of another example process for determining an RTT.

FIG. 21 is a flowchart of another exemplary processes 2100 for determining an RTT such as an RTT associated with a plurality of ranging signals transmitted by the first WD to a second WD. Process 2100 (e.g., implemented in a first wireless device (WD), airborne station, etc.) includes, at step 2102, determining a plurality of expected response signals. Each expected response signal has a scrambling seed number and an expected sequence of time domain symbols corresponding to the scrambling seed number. Process 2100 further includes, at step S2104, receiving a plurality of response signals from the second WD in response to the plurality of ranging signals. For each response signal of the plurality of response signals, at step 2106, a plurality of frequency shifted time domain samples is determined from each response signal, where each frequency shifted time domain sample corresponds to a frequency shift of a plurality of frequency shifts. At step 2108, each frequency shifted time domain sample of the plurality of frequency shifted time domain samples is cross-correlated with the expected sequence of time domain symbols of each expected response signal of the plurality of expected response signals. The cross-correlating is performed for each scrambling seed number of each expected response signal.

At step S2110, a maximum correlation value is determined for each frequency shift and each frequency shifted time domain sample. At step, S2112, the maximum correlation value is summed for each frequency shift, each frequency shifted time domain sample, and each response signal. Process 2100 further includes, at step S2114, determining a peak correlation value based on the summed maximum correlation value and, at step S2116, determining at least the RTT associated with the plurality of ranging signals based at least in part on the peak correlation value.

In some embodiments, the plurality of ranging signals is transmitted, each ranging signal being transmitted at a first time value. The peak correlation value is associated with a second time value. Determining the at least RTT associated with the plurality of ranging signals is further based at least in part on the first and second time values.

In some other embodiments, the cross-correlating uses a branched correlator including a plurality of cross-correlators and a plurality of parallel branches.

In an embodiment, each cross correlator corresponds to one parallel branch, and each cross-correlator is tuned to a different frequency offset to cover a range of carrier frequency offsets (CFO).

In another embodiment, each frequency shifted time domain sample of the plurality of frequency shifted time domain samples from each response signal is saved in one matched filter corresponding to one cross-correlator of the plurality of cross-correlators.

In some embodiments, a reception window is opened after each ranging signal is transmitted by the first WD to the second WD. At least one response signal is received after the reception window is opened. Determining the plurality of frequency shifted time domain samples is performed after the reception window is opened. The reception window is closed, and the cross-correlating is performed after the reception window is closed.

In some other embodiments, a maximum correlation output is determined for each frequency shifted time domain sample associated with the summed maximum correlation value, and a rolling sum value is calculated for each frequency shifted time domain sample. Further, a peak rolling sum correlation value is determined based on the rolling sum value, the rolling sum value (RS) being defined as:

For $AC_b = \{ac_1, ac_2, ac_3, \ldots ac_K\}$ where additive correlation, AC, is a sum of all reception windows in a burst, and K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in a rolling sum window, and,
for k=1 to K, $ac_k = \sum_{n=1}^{N} ac_{nk}$
where N is the number of ranging signals in a burst.

In an embodiment, the plurality of ranging signals is a burst of N transmissions of a series of bursts, there being a time interval (Tp) between a transmission of each ranging signal of the plurality of ranging signals and another ranging signal of the plurality of ranging signals that is immediately subsequent. Further, there is a wait time (Tw) between each burst of N transmission, and each ranging signal of the plurality of signals is an orthogonal frequency division multiplex (OFDM) ranging signal.

In another embodiment, each ranging signal of the plurality of ranging signals is one of a request-to-send, RTS, signal and a data null signal.

The following in a nonlimiting list of embodiments, according to the principles of the present disclosure:

Embodiment 1. A method in a first wireless device (WD), to increase the range of active geo-location of devices, for example, those compliant with IEEE 802.11, the method comprising:
transmitting a plurality of orthogonal frequency diversity modulation, OFDM, ranging signals and at a time t1 of each transmission;
determining expected sequences of time domain symbols for each possible scrambling seed;
opening a reception window after each transmission, and while the reception window is open:
  saving the sampled stream of frequency shifted local time domain copies of the received time domain symbols;
  closing the reception window;
  cross-correlating the sampled stream of frequency shifted local time domain copies of the received time domain symbols with the expected sequences of the time domain symbols for each possible scrambling seed;
  determining for each frequency shift, the maximum correlation output for each sample;
  summing the correlations for each sample; for each frequency shift, across the reception windows;
  determining the maximum correlation output for each sample of the summed correlations;

determining the peak correlation value;
determining a time t2 that corresponds to the peak correlation value; and
calculating a round trip time, RTT, for that burst.

Embodiment 2. The method of Embodiment 1, further comprising:
using a branched correlator using multiple cross correlators in parallel branches, each cross correlator tuned to a different frequency offset to cover the range of carrier frequency offsets, CFO, permitted by an IEEE 802.11 Standard.

Embodiment 3. The method of Embodiment 1, wherein each transmitted ranging signal is one of a request-to-send, RTS, signal and a data null signal.

Embodiment 4. The method of Embodiment 1, wherein the method further comprises:
sum ming the correlations for each sample; for each frequency shift, across the reception windows;
determining the maximum correlation output for each sample of the summed correlations;
calculating a rolling sum for each sample;
determining a peak rolling sum correlation value; and
where the rolling sum value RS is defined as:

For $AC=\{ac_1,ac_2,ac_3, \ldots ac_K\}$

Where K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in the rolling sum window,
and, for k=1 to K, $ac_k = \Sigma_{n=1}^{N} ac_{nk}$ where N is the number of packets in a burst.

Embodiment 5. The method of Embodiment 1, wherein a plurality of orthogonal frequency diversity modulation, OFDM, ranging signals are transmitted in a burst of N transmissions with a time Tp between each transmission, and a wait time Tw between each burst, and the correlations for each sample are summed for each frequency shift, across N reception windows.

Embodiment 6. A wireless device (WD), comprising:
a transmitter configured to transmit a plurality of orthogonal frequency diversity modulation, OFDM, ranging signals and recording a time t1 of each transmission; and
processing circuitry in communication with the transmitter, the processing circuitry configured to:
determine an expected sequences of time domain symbols for each possible scrambling seed;
open a reception window after each transmission, and while the reception window is open:
save the sampled stream of frequency shifted local time domain copies of the received time domain symbols;
close the reception window;
cross-correlate the sampled stream of frequency shifted local time domain copies of the received time domain symbols with the expected sequences of the time domain symbols for each possible scrambling seed;
determine for each frequency shift, the maximum correlation output for each sample;
sum the correlations for each sample; for each frequency shift, across the reception windows;
determine the maximum correlation output for each sample of the summed correlations;
determine the peak correlation value;
record a time t2 that corresponds to the peak correlation value; and
calculate a round trip time, RTT, for that burst.

Embodiment 7. The WD of Embodiment 6, wherein the processing circuitry is further configured to use a branched correlator using multiple cross correlators in parallel branches, each cross correlator tuned to a different time offset to cover the range of carrier frequency offsets, CFO, permitted by an IEEE 802.11 Standard;

Embodiment 8 The WD of Embodiment 6, wherein each transmitted ranging signal is one of a request-to-send, RTS, signal and a data null signal.

Embodiment 9. The WD of Embodiment 7, wherein the processing circuitry is further configured to:
sum the correlations for each sample; for each frequency shift, across the reception windows;
determine the maximum correlation output for each sample of the summed correlations;
calculate a rolling sum for each sample;
determine the peak rolling sum correlation value;
where the rolling sum value RS is defined as:

For $AC=\{ac_1,ac_2,ac_3, \ldots ac_K\}$

Where K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in the rolling sum window,
and, for k=1 to K, $ac_k = \Sigma_{n=1}^{N} ac_{nk}$ where N is the number of packets in a burst.

Embodiment 10. The first WD of Embodiment 6, wherein a transmitter is further configured to transmit a plurality of orthogonal frequency diversity modulation, OFDM, ranging signals in a burst of N transmissions with a time Tp between each transmission, and a wait time Tw between each burst, and
the processing circuitry is further configured to sum, for each frequency shift, the correlations for each sample, across N reception windows.

Embodiment 11. An airborne station, comprising:
a transmitter configured to:
transmit a plurality of ranging signals in a burst of N transmissions, with a time Tp between each transmission, and a wait time Tw between each burst, a ranging signal being one of a request-to-send, RTS, signal and a data null signal; and record the time of each transmission; and
a receiver configured to:
open a reception window after each transmission of a ranging signal of the plurality of ranging signals, and while the reception window is open:
save the sampled stream of frequency shifted local time domain copies of the received time domain symbols;
close the reception window;
cross-correlate the sampled stream of frequency shifted local time domain copies of the received time domain symbols with the expected sequences of the time domain symbols for each possible scrambling seed;
determine for each frequency shift, the maximum correlation output for each sample;

sum the correlations for each sample; for each frequency shift, across the N reception windows;
determine the maximum correlation output for each sample of the summed correlations;
determine the peak correlation value;
record a time t2 that corresponds to the peak correlation value; and
calculate a round trip time, RTT, for that burst.

Embodiment 12. The airborne station of Embodiment 11, wherein the processing circuitry is further configured to use a branched correlator using multiple cross correlators in parallel branches, each cross correlator tuned to a different time offset to cover the range of carrier frequency offsets, CFO, permitted by an IEEE 802.11 Standard.

Embodiment 13. The airborne station of Embodiment 11, wherein the receiver is further configured to:
sum the correlations for each sample; for each frequency shift, across the reception windows;
determine the maximum correlation output for each sample of the summed correlations;
calculate a rolling sum for each sample;
determine the peak rolling sum correlation value;
where the rolling sum value RS is defined as:

For $AC=\{ac_1, ac_2, ac_3, \ldots ac_K\}$

Where K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in the rolling sum window, and, for k=1 to K, $ac_k = \Sigma_{n=1}^{N} ac_{nk}$ where N is the number of packets in a burst.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

While the above description contains many specifics, these should not be construed as limitations on the scope, but rather as an exemplification of several embodiments thereof. Many other variants are possible including, for examples: the number of transmissions in a burst, the time between transmissions within a burst, the wait time between bursts, the start and end times of the reception window, the duration field value(s), the MAC address used in the ranging packet, the number of branches and time shifts in the branched correlator, the details of the rolling sum, the order of applying the rolling sum. Accordingly, the scope should be determined not by the embodiments illustrated, but by the claims and their legal equivalents.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a first wireless device (WD) for determining at least a round trip time (RTT) associated with a plurality of ranging signals transmitted by the first WD to a second WD and a plurality of response signals received from the second WD in response to the plurality of ranging signals, the method comprising:
  determining a plurality of expected response signals, each expected response signal having an expected sequence of time domain symbols;
  for each response signal of the plurality of response signals:
    determining a plurality of time domain samples from each response signal;
    cross-correlating each time domain sample of the plurality of time domain samples with the expected sequence of time domain symbols of each expected response signal of the plurality of expected response signals;
    determining a maximum correlation value at least for each time domain sample;
  determining a peak correlation value based at least in part on the determined maximum correlation value; and
  determining at least the RTT associated with the plurality of ranging signals based at least in part on the peak correlation value.

2. The method of claim 1, wherein the method further includes:
  transmitting the plurality of ranging signals, each ranging signal being transmitted at a first time value, the peak correlation value being associated with a second time value, the determining the at least RTT associated with the plurality of ranging signals being further based at least in part on the first and second time values; and
  receiving a plurality of response signals from the second WD in response to the plurality of ranging signals.

3. The method of claim 1, wherein the method further includes:
  summing the maximum correlation value for each frequency shift, each time domain sample, and each response signal, the peak correlation value being determined further based on the summed maximum correlation value.

4. The method of claim 1, wherein the cross-correlating uses a branched correlator including a plurality of cross-correlators and a plurality of parallel branches, and
  each cross correlator corresponds to one parallel branch, each cross-correlator being tuned to a different frequency offset to cover a range of carrier frequency offsets, CFO.

5. The method of claim 4, wherein time domain sample of the plurality of time domain samples from each response signal is saved in one matched filter corresponding to one cross-correlator of the plurality of cross-correlators.

6. The method of claim 1, wherein the method further includes:
  opening a reception window after each ranging signal is transmitted by the first WD to the second WD, at least one response signal being received after the reception window is opened, the determining the plurality of time domain samples being performed after the reception window is opened; and
  closing the reception window, the cross-correlating being performed after the reception window is closed.

7. The method of claim 6, wherein the method further includes:
  determining a maximum correlation output for each time domain sample associated with the maximum correlation value;
  calculating a rolling sum value for each frequency shifted time domain sample; and
  determining a peak rolling sum correlation value based on the rolling sum value, the rolling sum value (RS) being defined as:

For $AC=\{ac_1, ac_2, ac_3, \ldots ac_K\}$
  where additive correlation, AC, is a sum of all reception windows in a burst, and K=number of samples in the reception window, $$\text{For } k = \frac{(s-1)}{2} \text{ to } K - \frac{(s-1)}{2} \quad RS = \sum_{k-\frac{(s-1)}{2}}^{k+\frac{(s-1)}{2}} ac_k$$

where s=samples in a rolling sum window, and,
  for k=1 to K, $ac_k = \sum_{n=1}^{N} ac_{nk}$
  where N is the number of ranging signals in a burst.

8. The method of claim 1, wherein the plurality of ranging signals is a burst of N transmissions of a series of bursts, there being a time interval (Tp) between a transmission of each ranging signal of the plurality of ranging signals and another ranging signal of the plurality of ranging signals that is immediately subsequent, there being a wait time (Tw) between each burst of N transmission, each ranging signal of the plurality of ranging signals being an orthogonal frequency division multiplex (OFDM) ranging signal.

9. The method of claim 1, wherein one or more of:
  each expected response signal further has a scrambling seed number, and the expected sequence of time domain symbols corresponds to the scrambling seed number;
  the cross-correlating is performed for each scrambling seed number of each expected response signal;
  the plurality of time domain samples is a plurality of frequency shifted time domain samples;
  each frequency shifted time domain sample corresponding to a frequency shift of a plurality of frequency shifts; and
  the maximum correlation value is determined for each frequency shift and each frequency shifted time domain sample.

10. A first wireless device (WD) configured to determine at least a round trip time (RTT) associated with a plurality of ranging signals transmitted by the first WD to a second WD and a plurality of response signals received from the second WD in response to the plurality of ranging signals, the WD comprising processing circuitry configured to:
  determine a plurality of expected response signals, each expected response signal having an expected sequence of time domain symbols;
  for each response signal of the plurality of response signals:
    determine a plurality of time domain samples from each response signal;
    cross-correlate each time domain sample of the plurality of time domain samples with the expected sequence of time domain symbols of each expected response signal of the plurality of expected response signals;
    determine a maximum correlation value at least for each time domain sample;
  determine a peak correlation value based at least in part on the determined maximum correlation value; and
  determine at least the RTT associated with the plurality of ranging signals based at least in part on the peak correlation value.

11. The first WD of claim 10, wherein the processing circuitry is further configured to:

cause transmission of the plurality of ranging signals, each ranging signal being transmitted at a first time value, the peak correlation value being associated with a second time value, the determining the at least RTT associated with the plurality of ranging signals being further based at least in part on the first and second time values; and receive a plurality of response signals from the second WD in response to the plurality of ranging signals.

12. The first WD of claim 10, wherein the processing circuitry is further configured to:

sum the maximum correlation value for each frequency shift, each time domain sample, and each response signal, the peak correlation value being determined further based on the summed maximum correlation value.

13. The first WD of claim 10, wherein the cross-correlating uses a branched correlator including a plurality of cross-correlators and a plurality of parallel branches, and each cross correlator corresponds to one parallel branch, each cross-correlator being tuned to a different frequency offset to cover a range of carrier frequency offsets, CFO.

14. The first WD of claim 13, wherein time domain sample of the plurality of time domain samples from each response signal is saved in one matched filter corresponding to one cross-correlator of the plurality of cross-correlators.

15. The first WD of claim 10, wherein the processing circuitry is further configured to:

open a reception window after each ranging signal is transmitted by the first WD to the second WD, at least one response signal being received after the reception window is opened, the determining the plurality of time domain samples being performed after the reception window is opened; and close the reception window, the cross-correlating being performed after the reception window is closed.

16. The first WD of claim 15, wherein the processing circuitry is further configured to:

determine a maximum correlation output for each time domain sample associated with the maximum correlation value;

calculate a rolling sum value for each frequency shifted time domain sample; and determine a peak rolling sum correlation value based on the rolling sum value, the rolling sum value (RS) being defined as:

For $AC=\{ac_1, ac_2, ac_3, \ldots ac_K\}$ where additive correlation, AC, is a sum of all reception windows in a burst, and K=number of samples in the reception window, For $k = \frac{(s-1)}{2}$ to $K - \frac{(s-1)}{2}$ $RS = \sum_{k-\frac{(s-1)}{2}}^{k+\frac{(s-1)}{2}} ac_k$ where s=samples in a rolling sum window, and,
for k=1 to K, $ac_k = \Sigma_k = \Sigma_{n=1}^{N} ac_{nk}$
where N is the number of ranging signals in a burst.

17. The first WD of claim 10, wherein the plurality of ranging signals is a burst of N transmissions of a series of bursts, there being a time interval (Tp) between a transmission of each ranging signal of the plurality of ranging signals and another ranging signal of the plurality of ranging signals that is immediately subsequent, there being a wait time (Tw) between each burst of N transmission, each ranging signal of the plurality of ranging signals being an orthogonal frequency division multiplex (OFDM) ranging signal.

18. The first WD of claim 10, wherein one or more of:

each expected response signal further has a scrambling seed number, and the expected sequence of time domain symbols corresponds to the scrambling seed number;

the cross-correlating is performed for each scrambling seed number of each expected response signal;

the plurality of time domain samples is a plurality of time domain samples;

each time domain sample corresponding to a frequency shift of a plurality of frequency shifts; and the maximum correlation value is determined for each frequency shift and each time domain sample.

19. An airborne station comprising a first WD and being configured to determine at least a round trip time (RTT) associated with a plurality of ranging signals transmitted by the first WD to a second WD and a plurality of response signals received from the second WD in response to the plurality of ranging signals, the first WD comprising processing circuitry configured to:

determine a plurality of expected response signals, each expected response signal having an expected sequence of time domain symbols;

for each response signal of the plurality of response signals:

determine a plurality of time domain samples from each response signal;

cross-correlate each time domain sample of the plurality of time domain samples with the expected sequence of time domain symbols of each expected response signal of the plurality of expected response signals;

determine a maximum correlation value at least for each time domain sample;

sum the maximum correlation value for each time domain sample and each response signal;

determine a peak correlation value based on the summed maximum correlation value; and determine at least the RTT associated with the plurality of ranging signals based at least in part on the peak correlation value.

20. The airborne station of claim 19, wherein the cross-correlating uses a branched correlator including a plurality of cross-correlators and a plurality of parallel branches, each cross correlator corresponding to one parallel branch, each cross-correlator tuned to a different frequency offset to cover a range of carrier frequency offsets, CFO, each time domain sample of the plurality of time domain samples from each response signal being saved in one matched filter corresponding to one cross-correlator of the plurality of cross-correlators.

* * * * *